(12) United States Patent
Narita et al.

(10) Patent No.: US 9,582,096 B2
(45) Date of Patent: Feb. 28, 2017

(54) INFORMATION PROCESSING APPARATUS, INFORMATION PROCESSING METHOD, AND PROGRAM

(71) Applicant: SONY CORPORATION, Tokyo (JP)

(72) Inventors: Tomoya Narita, Kanagawa (JP); Kazuyuki Yamamoto, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/374,939

(22) PCT Filed: Jan. 11, 2013

(86) PCT No.: PCT/JP2013/050419
§ 371 (c)(1),
(2) Date: Jul. 28, 2014

(87) PCT Pub. No.: WO2013/145804
PCT Pub. Date: Oct. 3, 2013

(65) Prior Publication Data
US 2015/0015520 A1 Jan. 15, 2015

(30) Foreign Application Priority Data

Mar. 28, 2012 (JP) ................................. 2012-074213

(51) Int. Cl.
*G06F 3/041* (2006.01)
*G06F 3/0485* (2013.01)
*G06F 3/0488* (2013.01)

(52) U.S. Cl.
CPC .......... *G06F 3/0412* (2013.01); *G06F 3/0485* (2013.01); *G06F 3/04883* (2013.01);
(Continued)

(58) Field of Classification Search
CPC .. G06F 3/0485; G06F 3/0412; G06F 3/04883; G06F 3/04886; G06F 2203/04803; G06F 2203/04806
(Continued)

(56) References Cited

U.S. PATENT DOCUMENTS 8,427,437 B2 * 4/2013 Chae et al. ................. 345/173
2007/0300182 A1 12/2007 Bilow
(Continued)

FOREIGN PATENT DOCUMENTS

| EP | 2 149 840 A1 | 2/2010 |
|----|----|----|
| JP | 2007-257220 | 10/2007 |

(Continued)

OTHER PUBLICATIONS

International Search Report issued Apr. 9, 2013 in PCT/JP2013/050419.
Office Action issued Feb. 9, 2016 to Japanese Patent Application No. 2014-507458.
Supplemental Partial European Search Report issued Dec. 4. 2015 to European Patent Application No. 13768761.2.

*Primary Examiner* — Michael Pervan
*Assistant Examiner* — Andrew Lee
(74) *Attorney, Agent, or Firm* — Oblon, McClelland, Maier & Neustadt, L.L.P.

(57) ABSTRACT

Provided is an information processing apparatus including an operating body direction detection section configured to detect a longitudinal direction of an operating body, and an operating direction determination section configured to allocate a command to a direction with reference to the longitudinal direction of the operating body.

12 Claims, 31 Drawing Sheets

(52) U.S. Cl.
CPC .................... *G06F 3/04886* (2013.01); *G06F 2203/04803* (2013.01); *G06F 2203/04806* (2013.01)

(58) Field of Classification Search
USPC .......................... 715/700–866; 345/170–178
See application file for complete search history.

(56) References Cited

U.S. PATENT DOCUMENTS

| | | |
|---|---|---|
| 2010/0017872 A1* | 1/2010 | Goertz et al. ................... 726/16 |
| 2010/0127997 A1 | 5/2010 | Park et al. |
| 2010/0263946 A1 | 10/2010 | Miyazaki |
| 2011/0252357 A1* | 10/2011 | Chaudhri ............ G06F 3/04883 715/780 |
| 2012/0032891 A1 | 2/2012 | Parivar |
| 2012/0154447 A1* | 6/2012 | Kim et al. ................... 345/661 |
| 2012/0162111 A1* | 6/2012 | Lee et al. ...................... 345/173 |
| 2012/0176322 A1* | 7/2012 | Karmi ................ G06F 3/04883 345/173 |

FOREIGN PATENT DOCUMENTS

| | | |
|---|---|---|
| JP | 2008-165735 | 7/2008 |
| JP | 2010-33158 A | 2/2010 |
| JP | 2010-97473 | 4/2010 |
| JP | 2010-250610 A | 11/2010 |
| JP | 2011-14044 | 1/2011 |
| JP | 2011-141753 A | 7/2011 |
| JP | 2011-164767 | 8/2011 |
| JP | 2011-221677 A | 11/2011 |

\* cited by examiner

FIG. 2
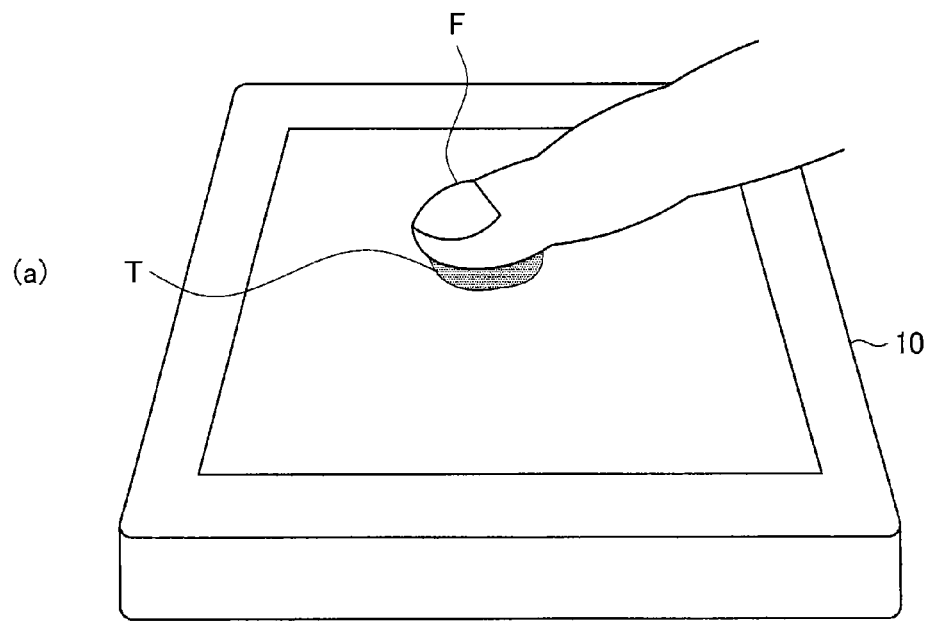
(a)
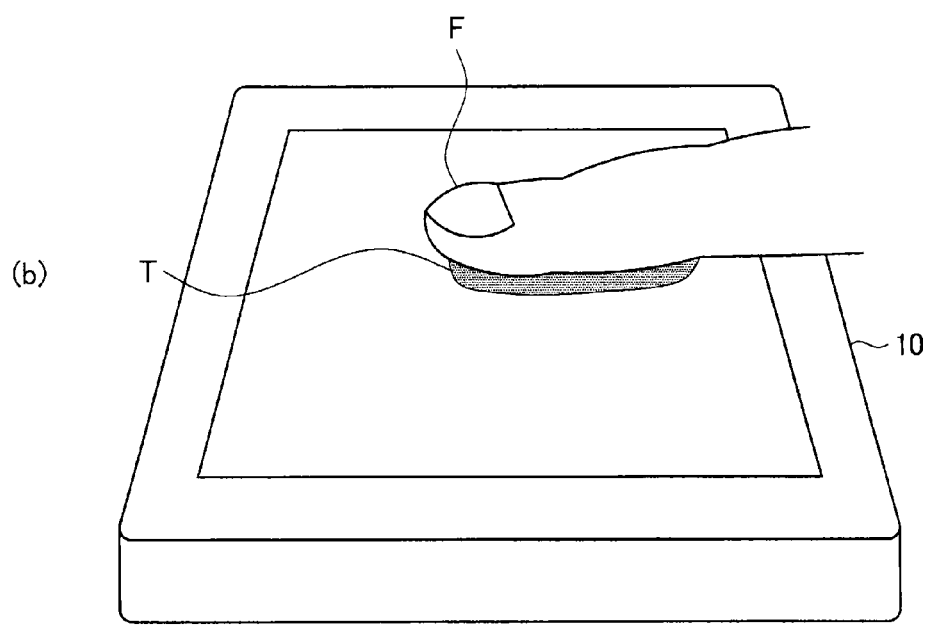
(b)

FIG. 3
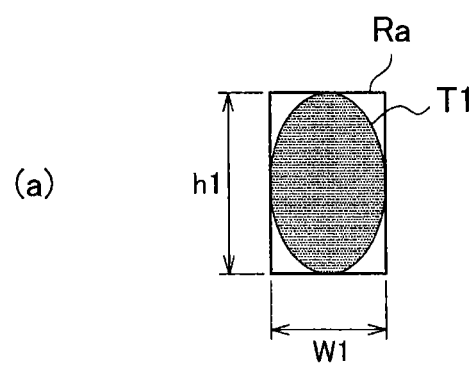
(a)
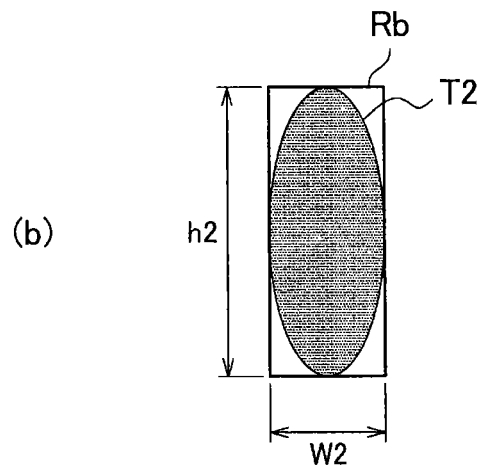
(b)

FIG. 29
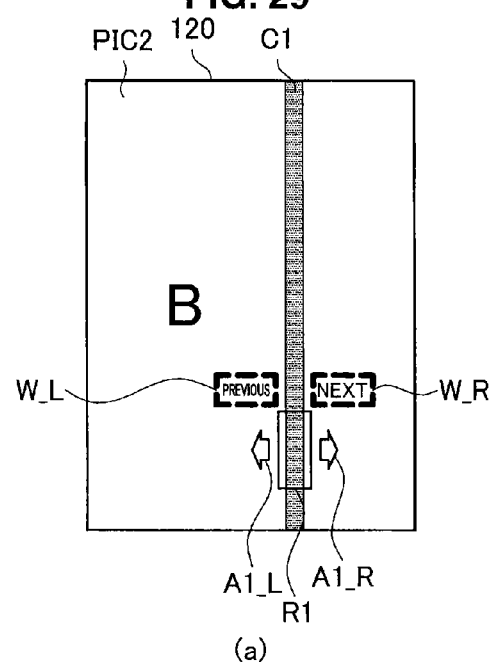
(a)
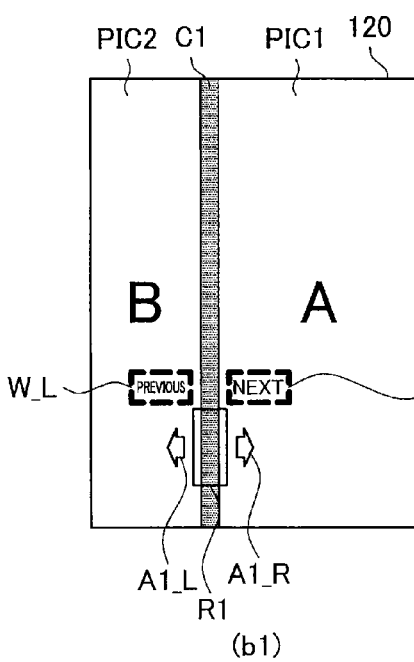
(b1)
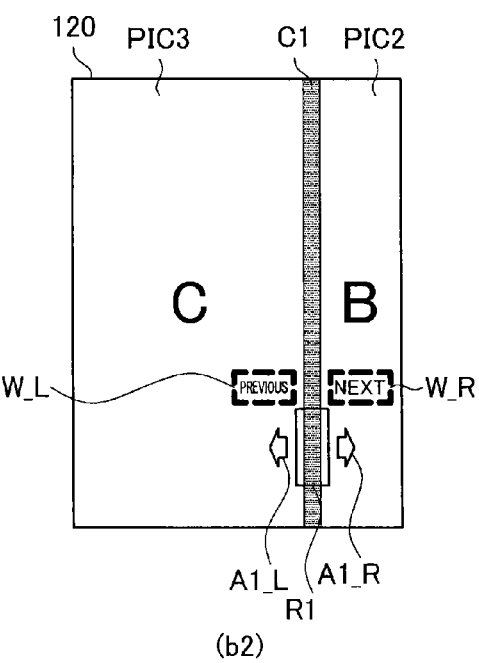
(b2)

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

Recently, in an information processing apparatus with a touch panel, a technology is disclosed which is capable of performing a position specification of an operating body, such as a finger, with high accuracy. For example, Patent Literature 1 discloses a technology in which a plurality of conductors is formed to have an island shape and, when a user operation is received, a relevant conductor is elastically deformed to perform operation detection.

Also, since it is possible to perform the position specification of the operating body with high accuracy as described above, more intuitive touch panel operating methods have been created.

For example, Patent Literature 2 discloses a technology that specifies a touch position and a touch area of a touch panel with respect to an operating body, and enlarges and displays an image displayed at the touch position on another screen according to the touch area.

Also, for example, Patent Literature 3 discloses a technology that detects an action of twisting an operating body by specifying a position of a touch point between the operating body and a display section and a position of an adjacent point different from the touch point, thus improving operability.

CITATION LIST

Patent Literature

Patent Literature 1: JP 2011-221677A
Patent Literature 2: JP 2011-141753A
Patent Literature 3: JP 2010-33158A

SUMMARY OF INVENTION

Technical Problem

However, the technology of Patent Literature 2 does not consider a direction when the operating body touches the touch panel.

Also, the technology of Patent Literature 3 considers a change in the direction of the operating body, but does not use the detected direction of the operating body in subsequent operations and lacks an intuitive characteristic.

Therefore, the present technology has been made in view of the aforementioned circumstances and is intended to provide a noble and improved information processing apparatus that enables a more intuitive operation in consideration of a direction of an operating body, an information processing method, and a program.

Solution to Problem

According to an embodiment of the present disclosure, there is provided an information processing apparatus including an operating body direction detection section configured to detect a longitudinal direction of an operating body, and an operating direction determination section configured to allocate a command to a direction with reference to the longitudinal direction of the operating body.

According to another embodiment of the present disclosure, there is provided an information processing method including detecting a longitudinal direction of an operating body, and allocating a command to a direction with reference to the longitudinal direction of the operating body.

According to another embodiment of the present disclosure, there is provided a program for causing a computer to execute an operating body direction detection function of detecting a longitudinal direction of an operating body, and an operation direction determination function of allocating a command to a direction with reference to the longitudinal direction of the operating body.

Advantageous Effects of Invention

According to the present disclosure, as described above, there are provided a noble and improved information processing apparatus that enables a more intuitive operation in consideration of a direction of an operating body, an information processing method, and a program.

BRIEF DESCRIPTION OF DRAWINGS

FIG. 2 is an explanatory diagram for describing an operation detecting method according to the same embodiment.

FIG. 3 is an explanatory diagram for describing an operating body shape specifying method according to the same embodiment.

FIG. 29 is an explanatory diagram for describing an application example of the same embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Incidentally, the description will be given in the following order.

Figure 14:
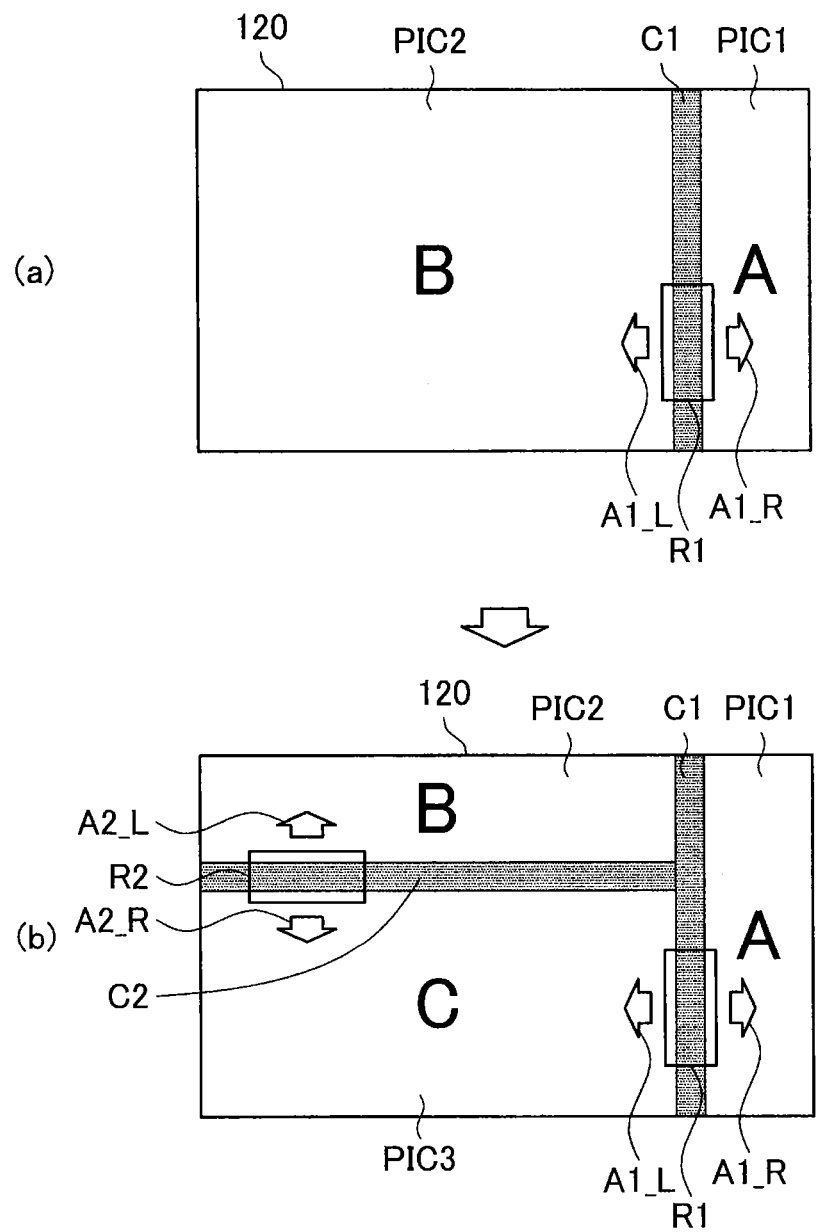
FIG. 14 is an explanatory diagram for describing an operating direction according to a first modification of the same embodiment.
Figure 15:
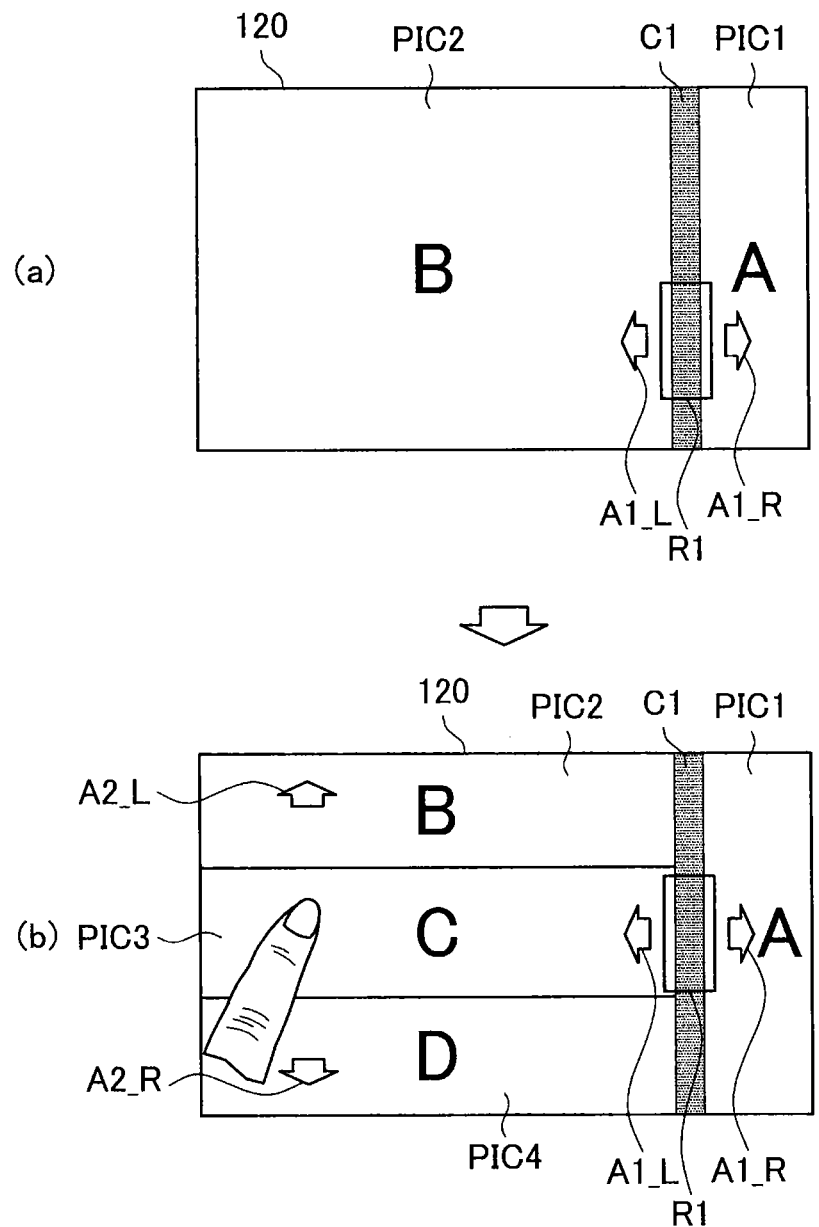
FIG. 15 is an explanatory diagram for describing a second modification of the same embodiment.
Figure 16:
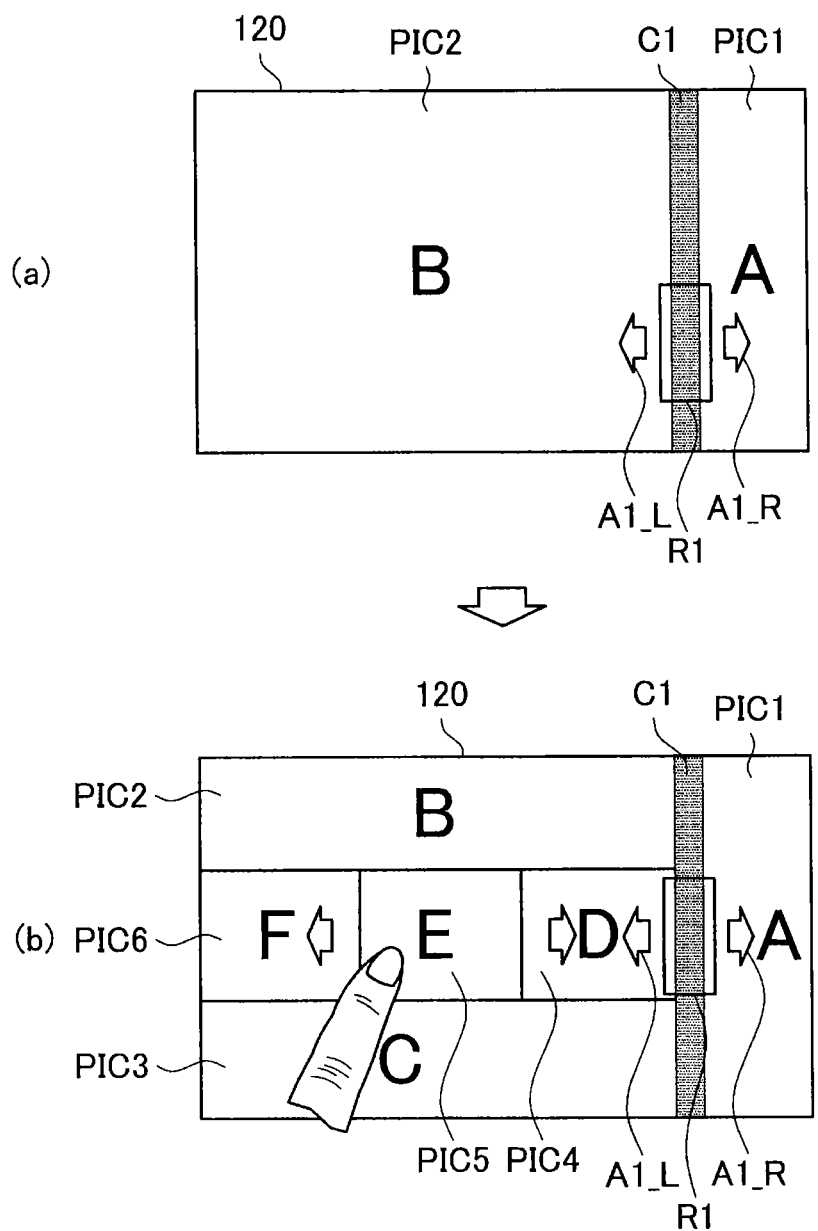
FIG. 16 is an explanatory diagram for describing a second modification of the same embodiment.
Figure 17:
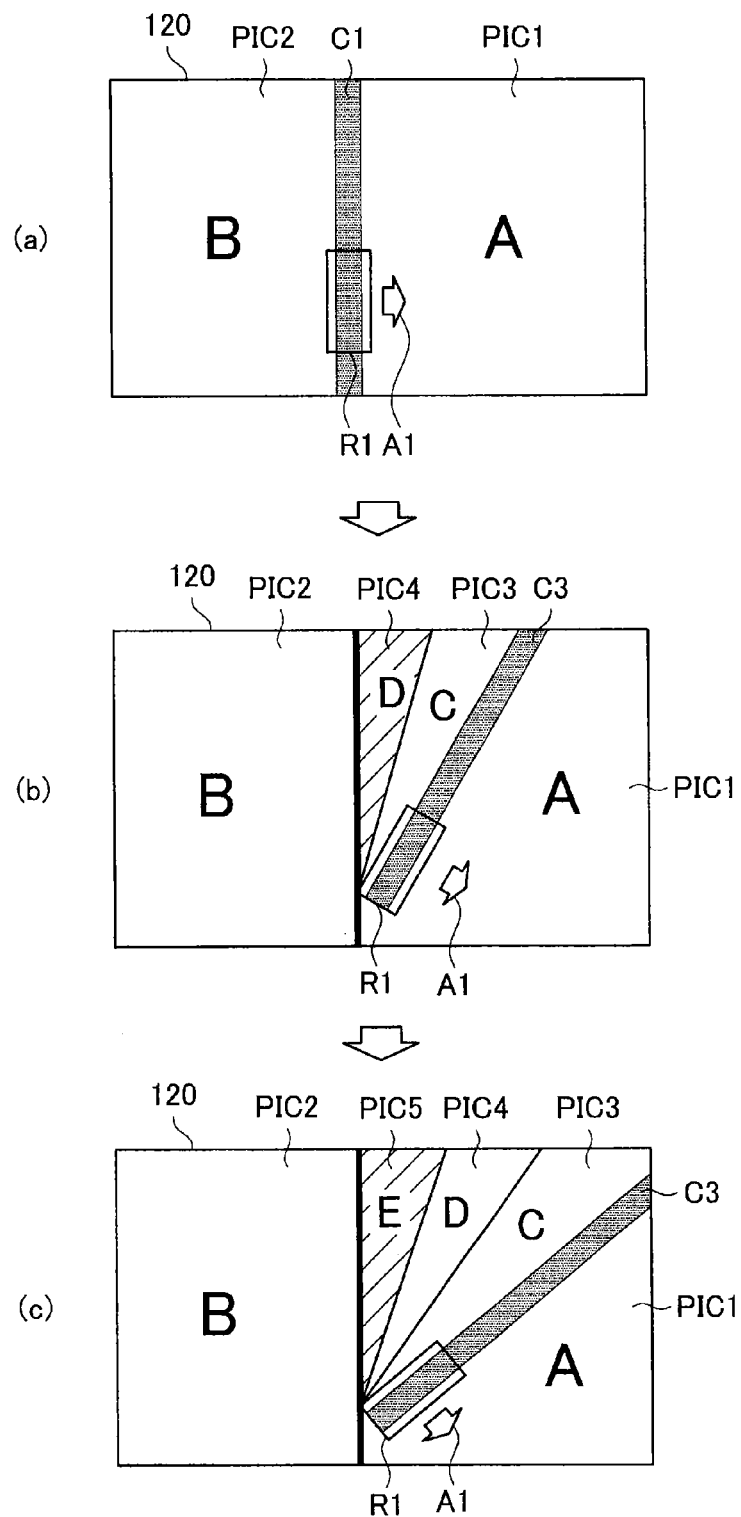
FIG. 17 is an explanatory diagram for describing a third modification of the same embodiment.
Figure 18:
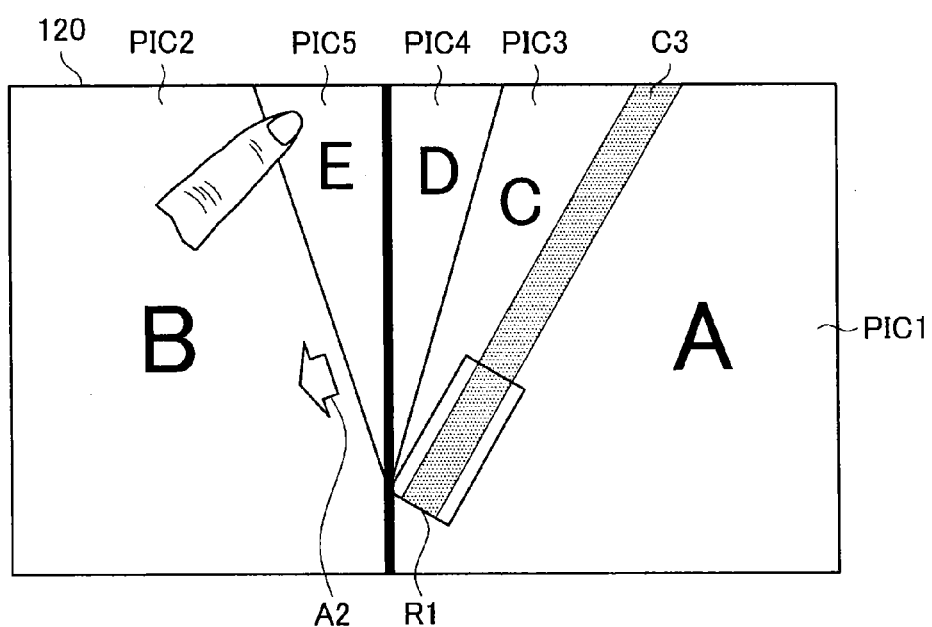
FIG. 18 is an explanatory diagram for describing a fourth modification of the same embodiment.

1: Overview
2: Basic Configuration (One-Finger Fat Swipe)
2-1: Overall Configuration (FIGS. 1 to 3)
2-2: Basic Operation of One-Finger Fat Swipe (FIG. 4)
2-3: Example of Operating Direction in One-Finger Fat Swipe (FIGS. 5 and 6)
2-4: Example of Region Division of Screen (FIGS. 7 and 8)
2-5: Processing Flow (FIGS. 9 and 10)
3: First Modification (Two-Finger Fat Swipe)
3-1: Basic Operation of Two-Finger Fat Swipe (FIG. 11)
3-2: Screen Switching in Two-Finger Fat Swipe (FIGS. 12 and 13)
3-3: Example of Operating Direction in Two-Finger Fat Swipe (FIG. 14)
4: Second Modification (1.5-Finger Fat Swipe; FIGS. 15 and 16)
5: Third Modification (One-Finger Twist Fat Swipe; FIG. 17)
6: Fourth Modification (1.5-Finger Twist Fat Swipe; FIG. 18)
7: Application Example
7-1: Application Example of Application Switching (FIGS. 19 to 22)
7-2: Application Example of Mode Switching (FIGS. 23 and 24)
7-3: Application Example of Setting of Parameter Values (FIGS. 25 to 28)
7-4: Application Example of Page Move Operation (FIGS. 29 and 30)
7-5: Application Example of Additional Information Provision (FIGS. 31 and 32)
7-6: Application Example of Game (FIG. 33)
8. Summary 1: Overview The present disclosure relates to an operation of a touch panel which is performed by a ball of a finger or the like and a detection of an operating direction, in addition to a normal operation by a fingertip or the like which is performed around one point of a touch panel. In the present disclosure, an operation method by touching a large area of a touch panel with not only a fingertip but also a ball of a finger will be referred to as a fat swipe.

In the following, first, a most basic switching method of a one-finger fat swipe mode of performing a fat swipe with one operating body (a finger or a touch pen or the like) and a normal mode of detecting a normal operation and contents of the one-finger fat swipe will be described. Next, a fat swipe performed with two operating bodies, a fat swipe combined with a normal operation, or a fat swipe of performing an operation by a motion of an operating body different from one-finger fat swipe will be described as modifications.

Furthermore, application examples in which the operation of the fat swipe is applied to various functions of various devices will be described.

2: Basic Configuration

One-Finger Fat Swipe

In the following, a switching method of a one-finger fat swipe mode and a normal mode, which is the most basic configuration in the present disclosure, and contents of the one-finger fat swipe will be described. The one-finger fat swipe refers to an operating method of touching a large area of a touch panel with one finger, not only a fingertip, and switching a screen or a function when the finger is moved in a horizontal direction perpendicular to the finger.

<2-1: Overall Configuration (FIGS. 1 to 3)>

Figure 1:
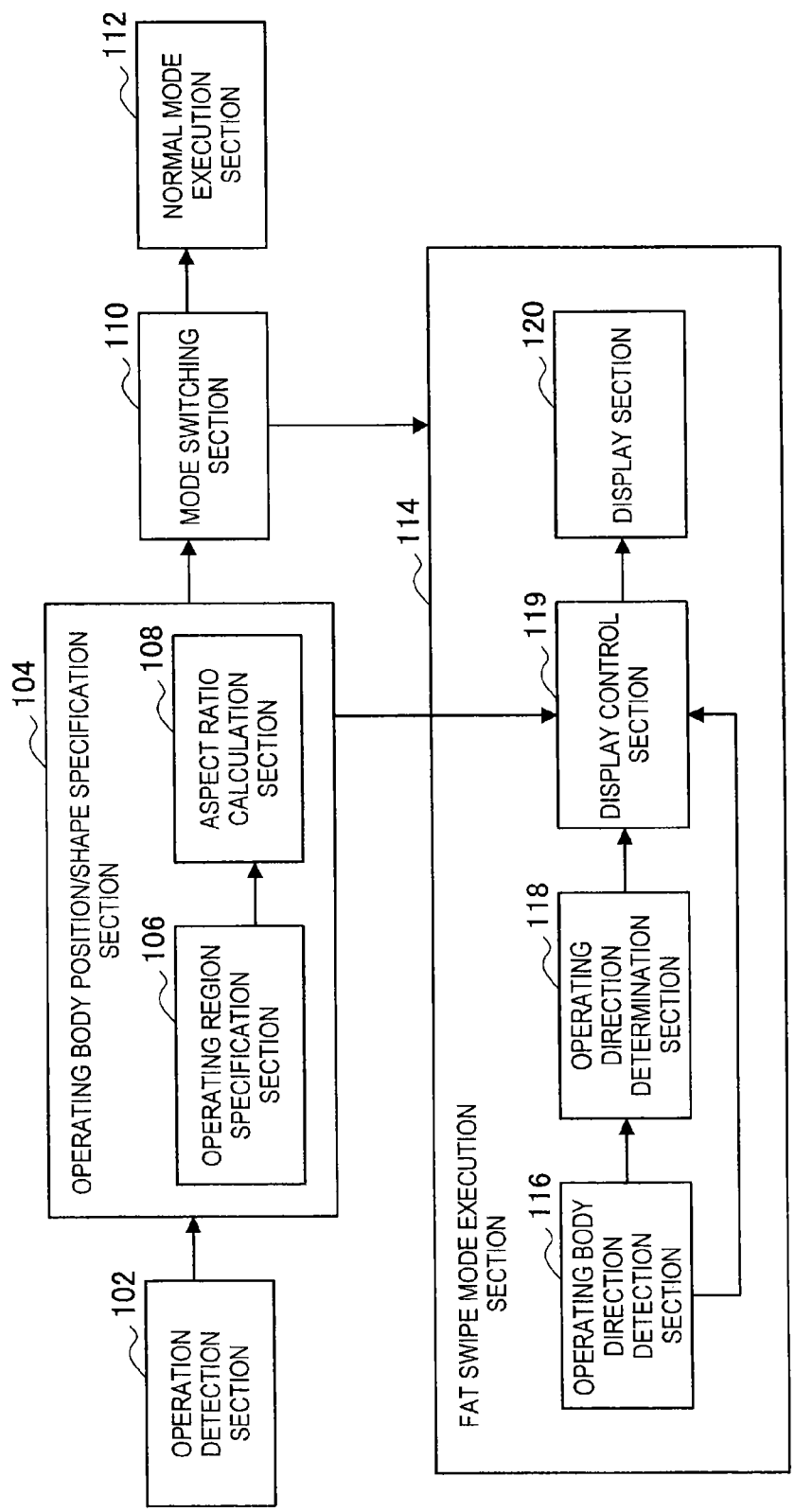
FIG. 1 is an explanatory diagram for describing a basic configuration of an information processing apparatus according to a first embodiment of the present disclosure.

Hereinafter, an overall configuration of an information processing apparatus according to the present embodiment will be described with reference to FIGS. 1 to 3. FIG. 1 is an explanatory diagram for describing a basic configuration of an information processing apparatus according to the present embodiment.

The overall configuration illustrated in FIG. 1 is an example, and some components may be modified, added, or removed. In the following, an information processing apparatus including an in-cell touch panel, in which a touch panel function is integrated into the inside of a liquid crystal panel, will be mainly described.

As illustrated in FIG. 1, the information processing apparatus 10 mainly includes an operation detection section 102, an operating body position/shape specification section 104, a mode switching section 110, a normal mode execution section 112, and a fat swipe mode execution section 114.

Also, the operating body position/shape specification section 104 includes an operation region specification section 106 and an aspect ratio calculation section 108. The fat swipe mode execution section 114 includes an operating body direction detection section 116, an operating direction determination section 118, a display control section 118, and a display section 120.

In a case where an operation is performed by a user of the information processing apparatus 10, first, the operation detection section 102 detects the relevant operation. On the touch panel, the user performs the operation with a finger or a touch pen or the like.

For example, like a conductor in an in-cell touch panel, the operation detection section 102 includes a sensor that acquires information capable of distinguishing a state in which the finger of the user is in contact with the touch panel, a state in which the finger of the user is in close proximity, and a state in which the finger of the user is separate from the touch panel.

In the present disclosure, the operation on the screen of the display section 120 by the user may be distinguished into contact and non-contact and may also be distinguished into close proximity and non close proximity. However, in the following, a case where the operation of the user is performed by the contact will be mainly described.

The operation detection section 102 detects a touch of a finger by the user. In an object to be detected, both of a case where the user touches with a fingertip with the intention of performing a normal operation and a case where a user touches in a large area, including a ball of a finger, with the intention of performing a fat swipe are included.

In a case where the operation on the screen of the display section 120 is performed by the user, a signal from the operation detection section 102 is input to the operating body position/shape specification section 104.

When a signal indicating that the operation on the screen of the display section 120 is performed by the user is input from the operation detection section 102, the operating body position/shape specification section 104 specifies the shape of the operating body, such as the finger. By specifying the shape, it is intended to distinguish a normal touch from a touch for performing a fat swipe.

FIG. 2 is an explanatory diagram for describing an operation detecting method. FIG. 2(*a*) illustrates a normal touch. Also, FIG. 2(*b*) illustrates a touch with the intention of a fat swipe.

TA of FIG. 2(*a*) indicates a touch region in a case where a user touches the information processing apparatus 10 by a hand H1 in a normal method. TB of FIG. 2(*b*) indicates a touch region in a case where a user touches the information processing apparatus 10 by a hand H2 with the intention of performing a fat swipe.

As illustrated in the touch region TA of FIG. 2(*a*) and the touch region TB of FIG. 2(*b*), the case of the touch in the normal method and the case of the touch with the intention of the fat swipe are different in the shape of the touch region. In the case of the touch with the intention of the fat swipe, the shape of the touch region is a longitudinally long shape as compared with the case of the normal touch, so that a ball of the finger also touches the screen of the display section 120.

Also, it is considered that the area of the touch region will also be increased as compared with the normal case, but the area of the touch region in each of the case of the normal touch and the case of the touch with the intention of the fat swipe has a great difference between individual users.

Furthermore, the difference or ratio of the areas of the touch regions in the case of the normal touch by the user and the case of the touch with the intention of the fat swipe by the user also has a great difference between individual users.

Therefore, in the present embodiment, the aspect ratio of the touch region is focused in the shape of the touch region, but it is not excluded to specify the shape of the touch region by focusing on the area of the touch region.

In the following, the operating body position/shape specification section 104 will be described in detail with reference to FIG. 3. FIG. 3 is an explanatory diagram for describing an operating body shape specifying method according to the same embodiment. FIG. 3(*a*) illustrates a normal touch. Also, FIG. 3(*b*) illustrates a touch with intention of a fat swipe.

As compared with the case of the normal touch illustrated in FIG. 3(*a*), in the case of the touch with the intention of the fat swipe illustrated in FIG. 3(*b*), when a touch region is enclosed with a rectangle, a ratio of a length in a longitudinal direction to a length in a transverse direction is large.

In view of the difference described above, it is possible to distinguish a normal touch from a touch with the intention of a fat swipe by surrounding a specific touch region with a rectangle and using a difference in an aspect ratio of the rectangle.

The operation region specification section 106 of the operating body position/shape specification section 104, first, specifies a touch region where the operating body touches the screen of the display section 120.

Examples of the method of detecting the touch region include a method of measuring a pressure of each portion of the display section 120.

Furthermore, the operation region specification section 106 surrounds the specified touch portion with a rectangle that best surrounds the shape of the touch portion and measures a length of the rectangle in a longitudinal direction and a direction of the rectangle in a transverse direction. Herein, the rectangle that best surrounds the shape of the touch portion is, for example, a rectangle that circumscribes the touch portion.

Also, the operation region specification section 106 specifies a position and a direction of the rectangle surrounding the touch portion and outputs information on the position and direction to the fat swipe mode execution section 114.

The length h of the rectangle in the longitudinal direction and the length w of the rectangle in the transverse direction, which are measured by the operation region specification section 106, are input to the aspect ratio calculation section 108. The aspect ratio calculation section 108 calculates a ratio of the input length h in the longitudinal direction to the input length w in the transverse direction as the aspect ratio of the rectangle surrounding the touch portion.

The aspect ratio of the rectangle, which is calculated by the aspect ratio calculation section 108, is input to the mode switching section 110. The mode switching section 110 selects one of the normal mode and the fat swipe mode by a range of the aspect ratio of the rectangle surrounding the touch portion.

For example, when the aspect ratio of the rectangle surrounding the touch portion is greater than or equal to a predetermined threshold value TH, the mode switching section 110 selects the fat swipe mode, and when less than the predetermined threshold value TH, the mode switching section 110 selects the normal mode.

The threshold value TH may be appropriately changed according to the shape of the finger of the user and the operating method.

In a case where the mode switching section 110 selects the normal mode, the normal mode execution section 112 executes the normal mode. In the normal mode, the user performs a fine operation with a fingertip or the like, and the normal mode execution section 112 executes various applications according to the operation of the user.

In a case where the mode switching section 110 selects the fat swipe mode, the fat swipe mode execution section 114 executes the fat swipe mode.

Information on the position and direction of the rectangle surrounding the touch portion, which are specified by the operating body position/shape specification section 104, is input to the operating body direction detection section 116 of the fat swipe mode execution section 114.

The operating body direction detection section 116 detects a direction of the operating body when the operating body touches the screen of the display section 120, based on the input position and direction of the rectangle surrounding the touch portion. For example, the operating body direction detection section 116 detects the longitudinal direction of the rectangle as the direction of the operating body.

The direction of the operating body, which is detected by the operating body direction detection section 116, is input to the operating direction determination section 118. The operating direction determination section 118 determines one direction or a plurality of directions in which the user can move the operating body, according to the detected direction of the operating body. The operating direction determination section 118 determines, for example, a direction perpendicular to the detected direction of the operating body as the operating direction.

For example, in a case where the operating body direction detection section 116 detects the longitudinal direction of the touch portion as the direction of the operating body, the operating direction determination section 118 determines the transverse direction of the touch portion as the operating direction.

Also, the operating direction determination section 118 includes a function of allocating a command corresponding to a relevant direction with respect to each direction in which the user can move the operating body.

Since the direction of the operating body touched on the screen of the display section 120 is determined by the intention of the user, a more intuitive operation is achieved by determining the direction in which the user can move the operating body according to the direction of the operating body as described above.

The fat swipe mode execution section 114 can specify the motion of the operating body, based on a change in the position of the operating body, which is specified by the operation region specification section 106 of the operating body position/shape specification section 104.

However, as described above, in the fat swipe mode, the direction in which the user can move the operating body is determined by the operating direction determination section 118. Therefore, when the motion of the operating body is represented by a vector, the description is given on the assumption that the following processing is performed by using a component of the direction determined by the operating direction determination section 118.

However, by further using the motion other than the direction determined by the operating body direction determination section 118, to perform other processing, in addition to the following processing, is not excluded.

The information indicating the direction of the operating body is input from the operating body direction detection section 116 to the display control section 119. Furthermore, the information indicating the operating direction is input from the operating direction determination section 118 to the display control section 119. Furthermore, the position information of the operating body is input from the operating body position/shape specification section 104 to the display control section 119.

The display control section 119 performs the display control of the display section 120, based on the input information. For examples of the display control with respect to the operation of the user and details of the command allocating method, refer to Section 2 below.

So far, the basic configuration of the information processing apparatus 10 according to the present embodiment has been described with reference to FIGS. 1 to 3.

Incidentally, even when one of the normal mode and the fat swipe mode is selected by the mode switching section 110, a switching from the normal mode to the fat swipe mode or a switching from the fat swipe mode to the normal mode may be performed by a subsequent method of touching the operating body by the user.

[2-2: Basic Operation of One-Finger Fat Swipe (FIG. 4)]

In the following, a basic operation of a one-finger fat swipe mode will be described with reference to FIG. 4. The one-finger fat swipe is the most basic among fat swipes that are performed by the fat swipe mode execution section 114.

Figure 4:
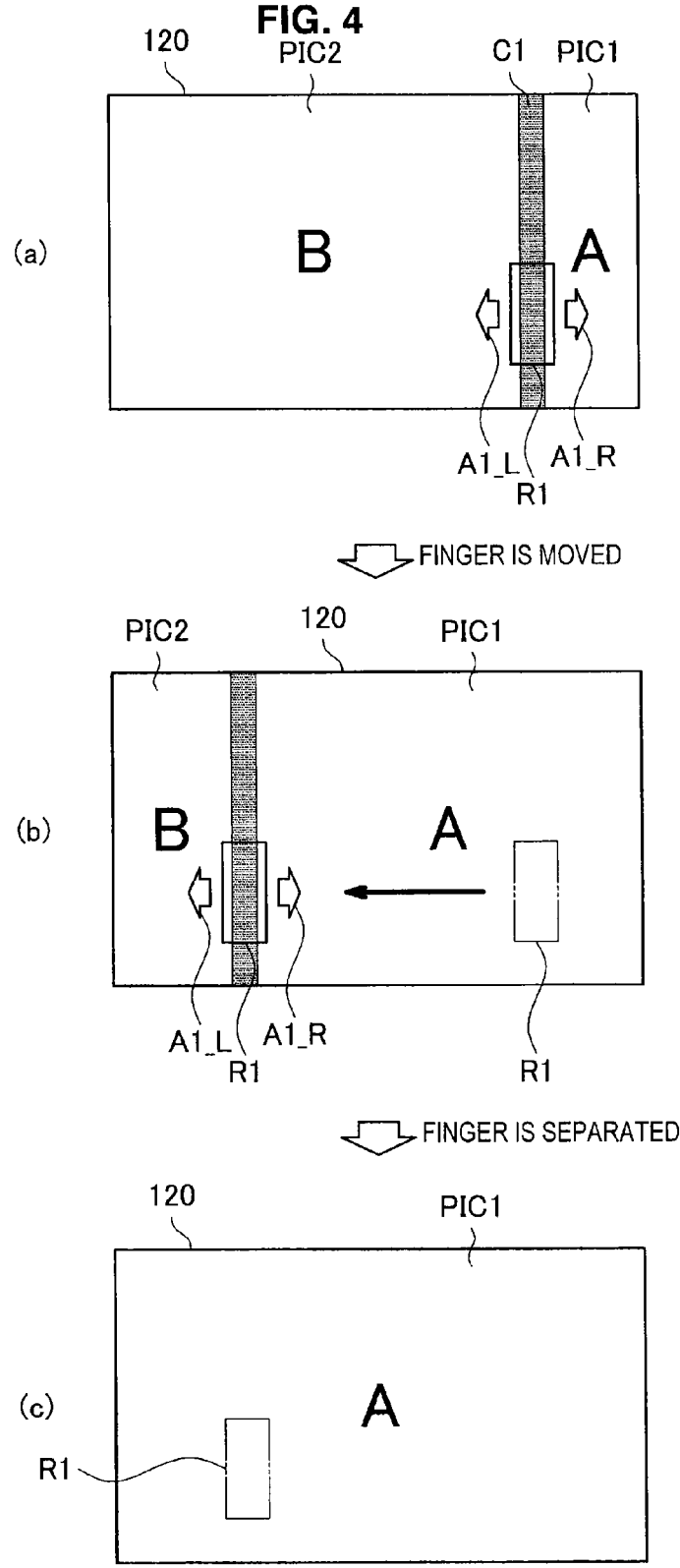
FIG. 4 is an explanatory diagram for describing a basic operating method according to the same embodiment.

FIG. 4 is an explanatory diagram for describing a basic operating method in a fat swipe mode. In FIG. 4, a screen display transition from (a) to (c) is illustrated.

R1 of FIG. 4 indicates the rectangle that surrounding the touch region between the operating body operated by the user and the screen of the display section 120 so as to best encloses the touch region (hereinafter, simply referred to as a rectangle). The rectangle may be displayed on the display section 120, and may be used only for processing, without being displayed.

As described above, the direction of the operating body is not limited to the longitudinal direction of the rectangle, but, in the following, the description is given on the assumption that the longitudinal direction of the rectangle is the operating body.

Also, in a case where the user touches the operating body on the screen of the display section 120, processing that is first performed by the information processing 10 will be described with reference to FIG. 4(*a*).

The display control section 119 displays a cursor C1 at the position of the rectangle of the display section 120. The display control section 119 displays the cursor C1 such that a longitudinal direction of the cursor C1 coincides with a longitudinal direction of the rectangle.

Also, the display control section 119 displays an arrow A1_R and an arrow A1_L corresponding to the directions which are determined by the operating direction determination section 118 and in which the user can move the operating body (hereinafter, referred to as the operating direction).

For example, the transverse direction of the rectangle is the operating direction, the display control section 119 displays the arrow A1_L on one side of the cursor C1, and displays the arrow A1_R on the other side of the cursor C1.

As described above, by displaying the arrow or the like corresponding to the direction in which the user can move the operating body and inducing the user into the moving direction of the operating body, it is possible to provide the user with a smoother operating feeling.

Furthermore, the display control section 119 performs different screen displays on both sides, with the longitudinal direction of the operating body as the reference (boundary). These correspond to different commands or applications. For example, before the operation is performed by the user, the display control section 119 displays a screen of PIC1 of FIG. 4 on the display section 120.

After that, when the user touches the screen of the display section 120 with the intention of the fat swipe, as illustrated in FIG. 4(*a*), the display control section 119 displays different images PIC1 and PIC2 on the left and right, with the longitudinal direction of the cursor C1 as the reference.

For example, a case where the image PIC1 is a home image displayed on standby or the like before various applications are started and the image PIC2 is an image associated with a specific application or function is considered.

In this case, when the home image PIC1 is displayed, the user can call the application associated with the image PIC2 by touching with the intention of the fat swipe, and the technology according to the present embodiment can be applied as a shortcut function.

When the user touches the screen of the display section 120 with the intention of the fat swipe, the screen display as illustrated in FIG. 4(*a*) is performed as described above.

Next, a case where the user moves the operating body while touching the operating body on the screen of the display section 120 is considered. FIG. 4(*b*) is an explanatory diagram for describing a case where the user further moves the operating body to the left side on the plane of the paper in the situation illustrated in FIG. 4(*a*).

When the user moves the operating body to the left side on the plane of the paper, the position and direction of the operating body are specified according to the motion by the operating body position/shape specification section 104, and the fat swipe mode execution section 114 determines the operating direction and performs the display control.

When the user moves the operating body, the display control section 119 follows the position of the displayed cursor C1 or the position of the displayed arrow A1_R or A1_L. Also, when the cursor C1 is moved, the boundary position of screen division of the display section 120, with the position of the cursor C1 as the boundary, is also changed.

As illustrated in FIG. 4(*a*), the user touches the operating body at a desired position with the intention of performing the fat swipe. After that, an area ratio of each of the screen displaying the displayed image PIC1 and the screen displaying the image PIC2 in the entire display section 120 can be changed by moving the operating body to a desired position.

Next, as an action intended by the user, there is a selection of the image PIC1 or a selection of the image PIC2. Incidentally, when each image is selected, the information processing 10 can perform the start of the application or the execution of the function in association with each image.

For example, when the user touches the operating body on the screen of the display section 120 and separates the operating body, which the user intends to select between two images with the position of the cursor C1 as the boundary can be determined by the position of the operating body or the moving direction of the operating body touched on the screen of the display section 120 immediately before being separated.

For example, it is considered that the screen of the display section 120 is divided into two regions along the longitudinal direction of the operating body. One region is referred to as a first region and the other region is referred to as a second region.

In FIG. 4, one of the first region and the second region is a left region and the other is a right region.

For example, as illustrated in FIG. 4(*c*), if the position of the display section 120 where the operating body is touched immediately before the user separates the operating body is the left region of the display section 120, the image PIC2 displayed on the right side of the cursor C1 can be determined as being selected. In this case, the display control section 119 displays the image PIC2 on the entire screen of the display section 120.

On the other hand, if the position of the display section 120 where the operating body is touched immediately before the user separates the operating body is the right region of the display section 120, the image PIC1 displayed on the left side of the cursor C1 can be determined as being selected. In this case, the display control section 119 displays the image PIC1 on the entire screen of the display section 120.

Also, the display control section 119 can switch the image to be displayed on the display section 120, considering the moving direction of the operating body in addition to the position where the operating body is touched immediately before the user separates the operating body.

For example, in a case where it is detected that the user moves the operating body from the left side to the right side of the display section 120 and, after the motion, it is detected that the user separates the operating body in the right region, the image displayed on the left region can be determined as being selected. In this case, the display control section 119 displays the selected image on the entire screen of the display section 120.

On the other hand, in a case where it is detected that the user moves the operating body from the left side to the right side of the display section 120, if the user separates the operating body in the left region, it is determined that the operation of performing switching the image is stopped on the way by the user, and the image displayed on the right region is displayed.

As described above, by switching the image displayed on the display section 120 according to the direction of the operating body and the position of the operating body immediately before being separated, it is possible to smoothly perform an intuitive operation to which the intention of the user is reflected.

So far, the basic operation of the one-finger fat swipe mode has been described with reference to FIG. 4.

[2-3: Example of Operating Direction in One-Finger Fat Swipe (FIGS. 5 and 6)]

In the above description of the basic operation, the case where the longitudinal direction of the display section 120 coincides with the transverse direction of the operating body has been described with reference to FIG. 4, but the scope of the technology according to the present embodiment is not limited thereto.

The operating body position/shape specification section 104 specifies the position and shape of the operating body, and the respective sections of the fat swipe mode execution section 114 performs the display control or the like according to the position and shape of the operating body.

Figure 5:
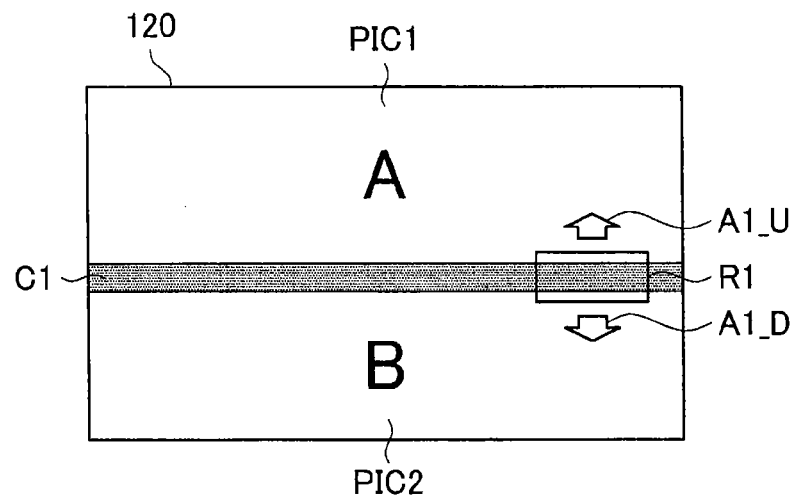
FIG. 5 is an explanatory diagram for describing an example of an operating direction.
Figure 6:
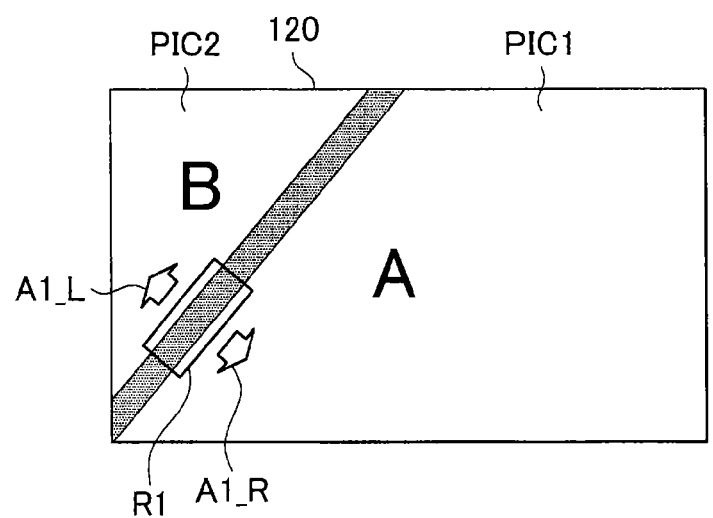
FIG. 6 is an explanatory diagram for describing an example of an operating direction.

In the following, a case where the touch direction of the operating body is different from the case of FIG. 4 will be described together with display examples with reference to FIGS. 5 and 6. FIGS. 5 and 6 are explanatory diagrams for describing examples of an operating direction.

For example, as illustrated in FIG. 5, in a case where the user touches the operating body such that the longitudinal direction of the display section 120 coincides with the transverse direction of the operating body, the cursor C1 is displayed such that the cursor C1 passes through the position of the operating body in the longitudinal direction of the display section 120. Also, the display control section 119 displays an arrow A1_U on one side and an arrow A1_D on the other side, with the position of the cursor C1 as the boundary.

Furthermore, the display control section 119 displays an image PIC1 and an image PIC2, with the position of the cursor C1 as the boundary.

The user can switch the screen by moving the operating body in the transverse direction of the display section 120.

Also, as illustrated in FIG. 6, it is possible to touch the operating body on the screen of the display section 120 in directions other than the longitudinal direction or the transverse direction of the display section 120.

As described above, it is possible to change the screen displaying method according to the touch direction of the operating body. Also, different images may be displayed according to the touch direction of the operating body, while the operating body is being touched.

For example, in a case where the image PIC1 is displayed on the display section 120, when the touch of the operating body in the longitudinal direction of the display section 120 is detected, the display control section 119 displays the image PIC2 in addition to the image PIC1.

On the other hand, in a case where the image PIC1 is displayed on the display section 120, when the touch of the operating body in the transverse direction of the display section 120 is detected, the display control section 119 displays an image PIC3 in addition to the image PIC1.

As described above, by associating the plurality of touch directions of the operating body, it is possible to realize a variation of more operations while maintaining an intuitive operation feeling.

So far, the examples of the operating direction have been described with reference to FIGS. 5 and 6.

[2-4: Example of Region Division of Screen (FIGS. 7 and 8)]

The description has been given of the method of determining which image is selected by the user according to the position of the operating body immediately before the user separates the operating body from the screen of the display section 120 (in other words, whether the function or the application associated with the image is selected).

At that time, it is determined to which region the position of the operating body belongs when the display section 120 is divided into two regions. The above description has been given of the case where the screen of the display section 120 is divided into two regions along the longitudinal direction of the operating body.

Figure 7:
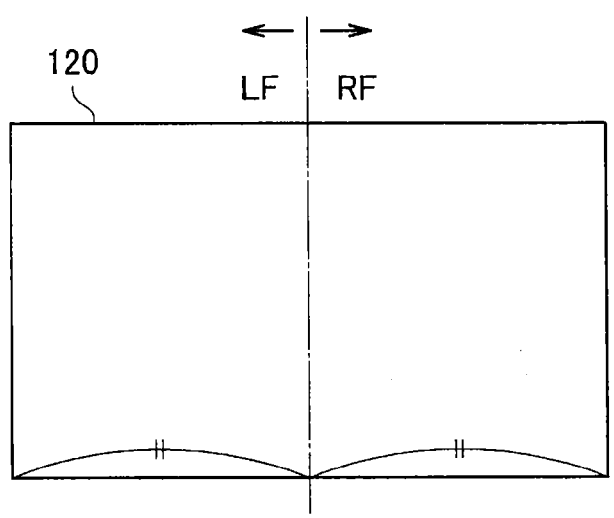
FIG. 7 is an explanatory diagram for describing an example of a region division of a screen.

In this case, as illustrated in FIG. 7, the display section 120 is divided into two regions (a first region RF and a second region LF) passing through the center of the display section 120.

Also, except for the method of dividing the region of the screen as described above, there may be a method of more relatively dividing the region of the screen with reference to the position of the operating body.

Figure 8:
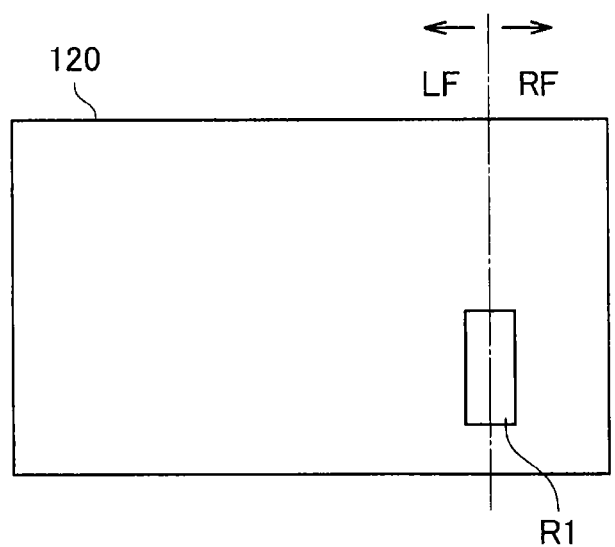
FIG. 8 is an explanatory diagram for describing an example of a region division of a screen.

For example, as illustrated in FIG. 8, the screen of the display section 120 can be divided into two regions (a first region RF and a second region LF), with reference to a line of the longitudinal direction of a rectangle R1 passing a start position where the user touches the operating body on the display section 120

[2-5: Processing Flow (FIGS. 9 and 10)]

Figure 9:
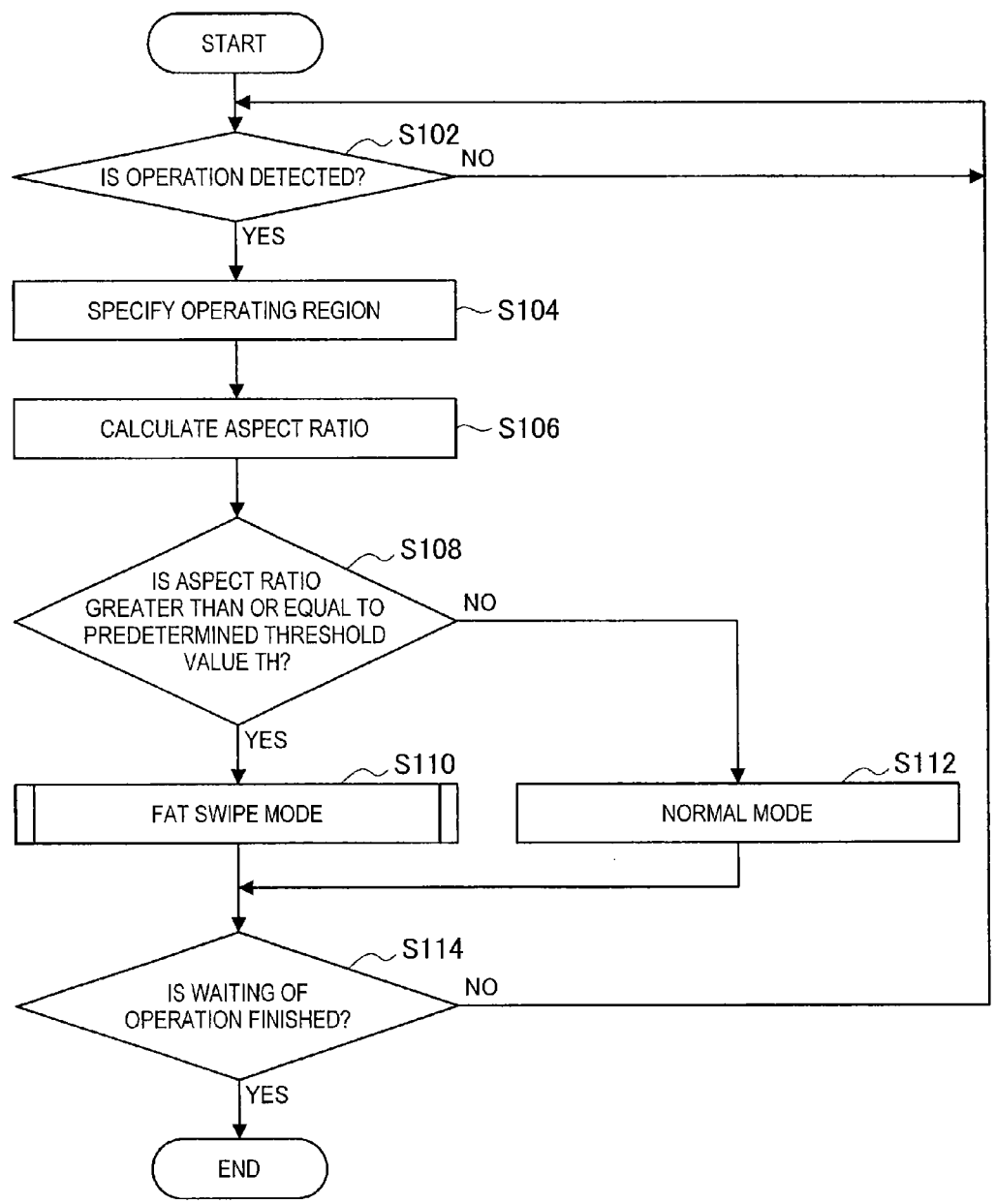
FIG. 9 is an explanatory diagram for describing a processing flow of an information processing method according to the same embodiment.
Figure 10:
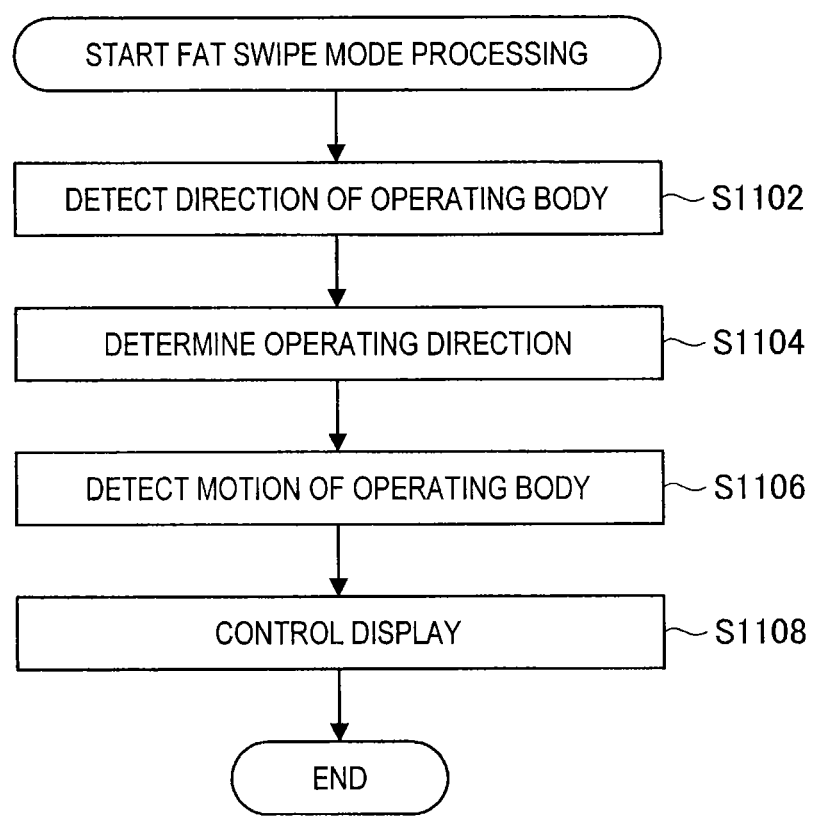
FIG. 10 is an explanatory diagram for describing a processing flow of an information processing method according to the same embodiment.

In the following, the processing flow that is performed by the information processing apparatus 10 according to the present embodiment will be described with reference to FIGS. 9 to 10. FIGS. 9 and 10 are explanatory diagrams for describing the processing flow that is performed by the information processing apparatus 10. FIG. 10 is a flowchart for describing details of processing step S110 of FIG. 9.

As illustrated in FIG. 9, first, the operation detection section 102 determines whether the operation of the information processing apparatus 10 has been performed by the user (S102).

In a case where the operation of the information processing apparatus 10 by the user is not detected, the processing flow waits until detected.

In a case where the operation of the information processing apparatus 10 by the user is detected, the operation region specification section 106 specifies the operation region (S104). The operation region corresponds to the touch region between the operating body and the display section 120 when the user performs the operation by touching the operating body on the screen of the display section 120.

The operation region specification section 106 first specifies the operation region and then surrounds the specified operation region with a rectangle that best encloses the operation region. Furthermore, the length of the relevant rectangle in the longitudinal direction and the length of the relevant rectangle in the transverse direction are also specified. The operation region specification section 106 measures the length h of the rectangle in the longitudinal direction and the length w of the rectangle in the transverse direction.

Subsequently, the aspect ratio calculation section 108 calculates a ratio of the length h in the longitudinal direction to the length w in the transverse direction, which is measured by the operation region specification section 106, as the aspect ratio of the rectangle (S106).

Subsequently, the mode switching section 110 performs the switching of the normal mode and the fat swipe mode, based on the aspect ratio of the rectangle.

For example, the mode switching section 110 determines whether the aspect ratio of the rectangle is greater than or equal to a predetermined threshold value (S108).

In a case where the aspect ratio of the rectangle is greater than or equal to the predetermined threshold value, the mode switching section 110 selects the fat swipe mode. The fat swipe mode execution section 114 executes the fat swipe mode (S110).

On the other hand, in a case where the aspect ratio of the rectangle is less than the predetermined threshold value, the mode switching section 110 selects the normal mode. The normal mode execution section 112 executes the normal mode (S112).

In a case where the fat swipe mode or the normal mode is executed, and a series of operations by the user and the operation of the information processing apparatus 10 based on the relevant operation are completed, the information processing apparatus 10 waits for a next operation from the user.

In a case where the waiting of the operation from the user is performed, the information processing apparatus 10 performs a series of processing again from the operation detection of processing step S102. On the other hand, in a case where the operation from the user is not performed for a predetermined time, the information processing apparatus 10 ends a series of processing (S114).

So far, the overall flow of the processing performed by the information processing apparatus 10 has been described with reference to FIG. 9. In the following, details of the processing performed by the fat swipe mode execution section 114 in step S110 of FIG. 9 will be described with reference to FIG. 10.

As illustrated in FIG. 10, first, the operating body direction detection section 116 of the fat swipe mode execution section 114 detects the direction of the operating body (S1102). For example, the operating body direction detection section 116 detects the longitudinal direction of the rectangle, which surrounds the operating body, as the direction of the operating body.

Subsequently, the operating direction determination section 118 determines the direction in which the user can move the operating body (S1104). For example, the operating direction determination section 118 determines a direction perpendicular to the direction of the operating body as the operating direction.

Subsequently, when the fat swipe mode execution section 114 detects the motion of the operating body (S1106), the display control section 119 performs the display control of the display section 120 according to the detected motion. For example, the display control section 119 displays the cursor C1 at the position of the operating body along the longitudinal direction of the operating body, displays the arrows A1_R and A1_L indicating the operating direction, divides the screen with the position of the cursor C1 as the boundary, and displays different images on the respective screens. After that, the information processing apparatus 10 ends a series of processing (S1108).

So far, details of the processing that is performed by the fat swipe mode execution section 114 in step S110 of FIG. 9 have been described with reference to FIG. 10.

Incidentally, the above processing flow is an example of a processing flow that is performed by the information processing apparatus 10, and the order of some processing steps may be changed or omitted.

3: First Modification

Two-Finger Fat Swipe

So far, the one-finger fat swipe performed by one operating body has been described. In the following, a first modification related to two-finger fat swipe performed by two operating bodies will be described. The two-finger fat swipe mode is a mode in which the technology of the one-finger fat swipe mode, which is the technology associated with the one-finger fat swipe, is associated with two operating bodies.

[3-1: Basic Operation of Two-Finger Fat Swipe (FIG. 11)]

Figure 11:
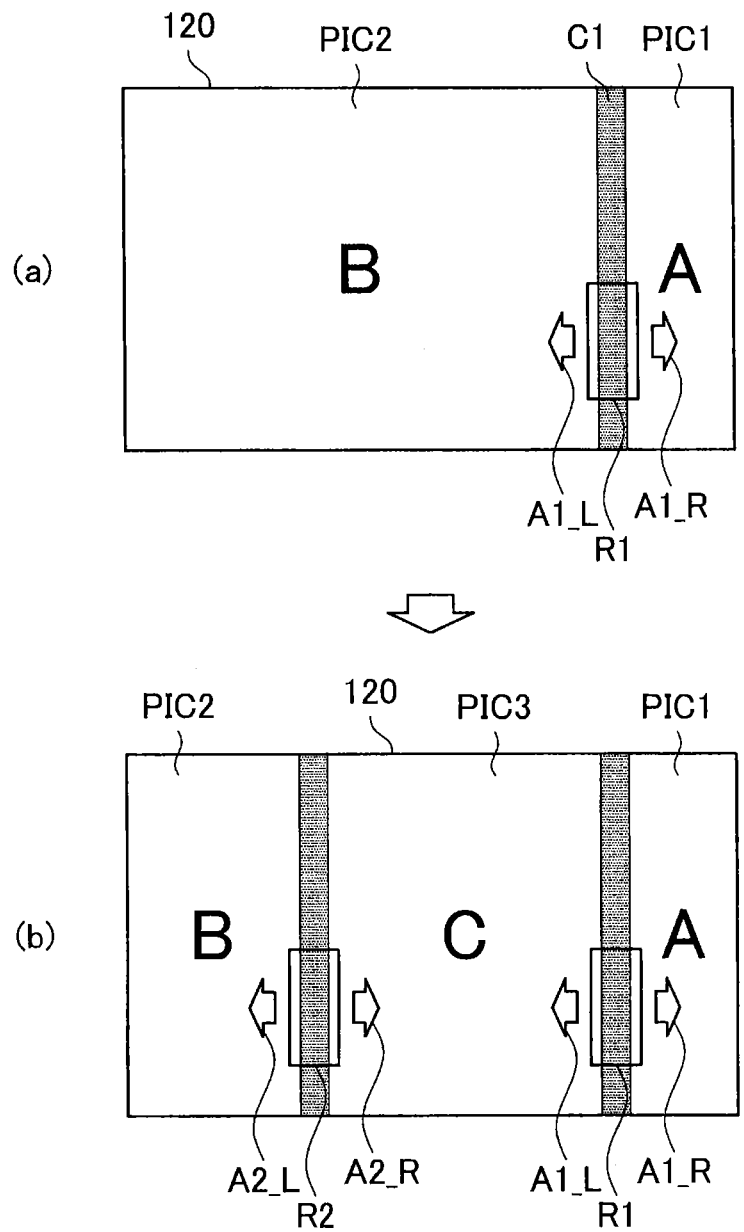
FIG. 11 is an explanatory diagram for describing an operation according to a first modification of the same embodiment.

First, in the following, the basic operation of the two-finger fat swipe performed by the user and the two-finger fat swipe mode performed by the information processing apparatus 10 according to the operation of the user will be described with reference to FIG. 11. FIG. 11 is an explanatory diagram for describing the operation of the present modification.

When the user touches the screen of the display section 120 with a first operating body (for example, a finger of one hand or the like) which is one operating body to perform an operation with the intention of performing the fat swipe, as illustrated in FIG. 11(a), the one-finger fat swipe mode is first executed.

Incidentally, in FIG. 11(a), R1 indicates a rectangle corresponding to the first operating body. The rectangle R1 may be actually displayed on the display section 120, or may not be displayed.

As described above, in a case where the user further touches a second operating body different from the first operating body on the screen of the display section 120 while the user operates the first operating body and the fat swipe mode execution section 114 of the information processing apparatus 10 executes the fat swipe mode, the execution of the two-finger fat swipe mode is started.

The operating body position/shape specification section 104 performs the specification of the position and shape of the second operating body, in a manner similar to the specification of the location and shape of the first operating body. The fat swipe mode execution section 114 executes the two-finger fat swipe mode by using the specification result of the operating body position/shape specification section 104.

An image viewed from the user during the execution of the two-finger fat swipe mode is illustrated in FIG. 11(b). In FIG. 11, during the execution of the one-finger fat swipe mode, the second operating body is touched on the display section 120 such that the longitudinal direction of the first operating body coincides with the longitudinal direction of the second operating body.

In FIG. 11(b), R2 indicates a rectangle corresponding to the second operating body. The rectangle R2 may be actually displayed on the display section 120, or may not be displayed.

The display control section 119 displays a cursor C2 corresponding to the second operating body at the position of the rectangle R2 of the display section 120. The display control section 119 displays the cursor C2 such that the longitudinal direction of the cursor C2 coincides with the transverse direction of the rectangle.

As described above, in the two-finger fat swipe mode, the two cursors C1 and C2 are displayed by the two operating bodies (the first operating body and the second operating body). The screen of the display section 120 is divided into three regions by the two cursors C1 and C2.

Therefore, during the execution of the two-finger fat swipe mode, the display control section 119 displays a third image PIC3, in addition to the images PIC1 and PIC2 displayed during the execution of the one-finger fat swipe mode.

In a case where the three images PIC1, PIC2 and PIC3 are displayed on the screen regions of the display section 120 divided into three regions, respectively, six patterns may be considered with respect to which images are to be displayed on the screen regions and on which screen regions the images are to be displayed.

However, when it is considered that the user performs an additional operation to display the image PIC3 in a state in which the images PIC1 and PIC2 are displayed, it is easy for the user to understand and operate the operation if the image PIC3 additionally displayed during the execution of the two-finger fat swipe mode is displayed in the region between the cursors C1 and C2.

Therefore, in the following, a case where the image PIC3 additionally displayed during the execution of the two-finger fat swipe mode is displayed in the region between the cursors C1 and C2 will be mainly described. In this case, when viewed from the user, as illustrated in FIG. 11(b), the image PIC3 associated with a new separate application or function is inserted between the images PIC1 and PIC2 originally displayed on the screen of the display section 120.

When the user moves the first operating body or the second operating body (fat swipe), the cursors C1 and C2 are moved to follow the operating body. Also, the area ratio of the respective screens displaying the respective images respect to the entire display section 120 is changed according to the motion of the cursors C1 and C2.

So far, the basic operation of the two-finger fat swipe performed by the user and the two-finger fat swipe mode performed by the information processing apparatus 10 according to the operation of the user have been described with reference to FIG. 11.

[3-2: Screen Switching in Two-Finger Fat Swipe (FIGS. 12 and 13)]

In the following, assuming that the two-finger fat swipe mode is executed as described above, a method of switching to a desired screen by a user will be described.

When the two-finger fat swipe mode is executed, the images PIC1, PIC2 and PIC3 are displayed in the respective screens with the positions of the two cursors C1 and C2 as the boundaries.

Figure 12:
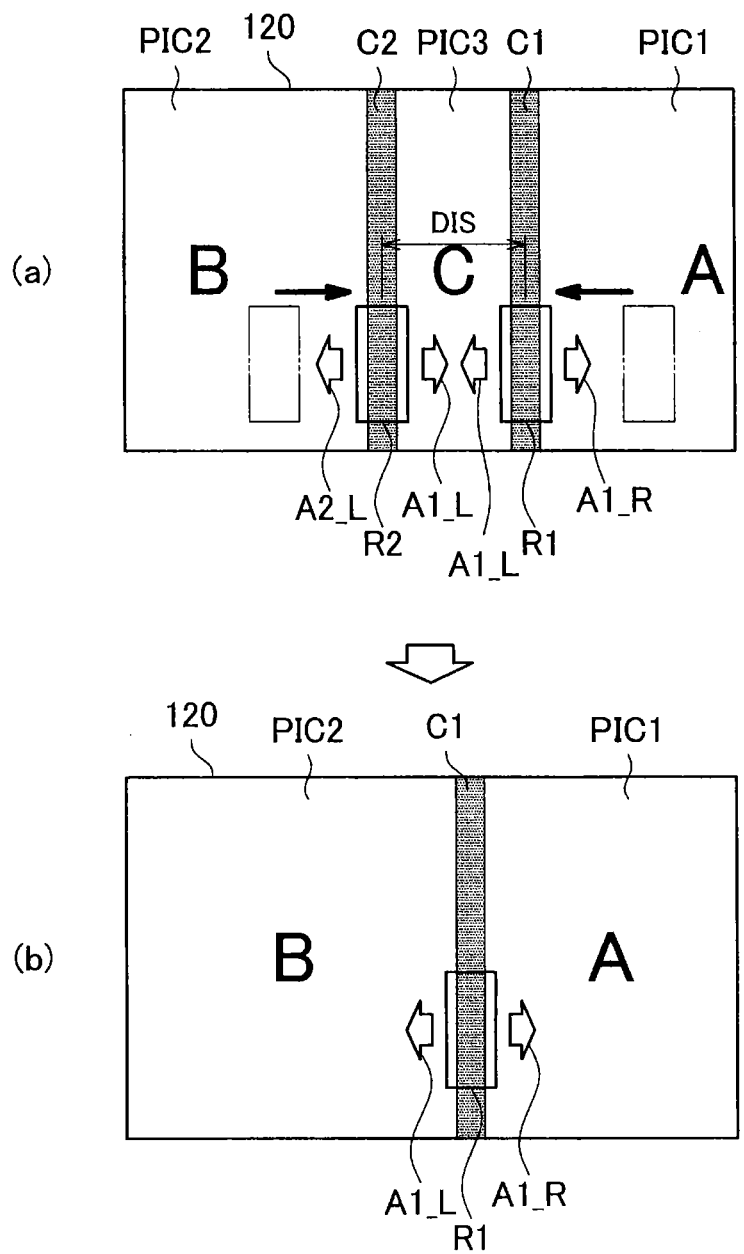
FIG. 12 is an explanatory diagram for describing a screen switching according to a first modification of the same embodiment.

First, a case where the user selects one of the images displayed on the regions of both sides in the screen of the display section 120 will be described with reference to FIG. 12. The example of FIG. 12(a) corresponds to a case where the user selects the image PIC1 or the image PIC2.

The user moves either or both of the first operating body and the second operating body such that the first operating body and the second operating body are close to each other. In this case, the display region of the image (in the example of FIG. 12(a), the image PIC3) displayed in the central region of the screen of the display section 120 is narrowed according to the motion.

As described above, in a case where the user moves the operating body such that the display region of the predetermined image (in the example of FIG. 12(a), the image PIC3) is narrowed, it is considered that there is no intention to select that image. In other words, it is considered that the images (in the example of FIG. 12(a), the images PIC1 and PIC2) other than that image are to be selected.

Also, when the first operating body and the second operating body are brought into close proximity within a predetermined distance, a need to distinguish the two operating bodies is reduced if it is difficult to bring the two operating bodies into close proximity within the predetermined distance.

Therefore, in the two-finger fat swipe mode, in a case where a distance DIS between the first operating body and the second operating body is less than a predetermined threshold value, the fat swipe mode execution section 114 switches from the two-finger fat swipe mode to the one-finger fat swipe mode.

FIG. 12(b) illustrates a screen display example after the switching from the two-finger fat swipe mode to the one-finger fat swipe mode.

That is, after the switching to the one-finger fat swipe mode, the display control section 119 displays one cursor C1, or two images with the cursor C1 as the boundary, or arrows A1_R and A1_L indicating the directions in which the user can move the operating body.

Herein, a case where the two operating bodies are all touched on the display section 120 at the moment of the switching from the two-finger fat swipe mode to the one-finger fat swipe mode is considered.

In this case, for example, it is considered that the information processing apparatus 10 detects which one of the two operating bodies touched on the display section 120 as the operating body in the execution of the one-finger fat swipe mode.

In the above manner, the user can perform the one-finger fat swipe in a state in which one of the two touched operating bodies is touched on the display section 120. As a result, it is possible to smoothly switch from the two-finger fat swipe mode to the one-finger fat swipe mode.

After the switching to the one-finger fat swipe mode, the user can perform the one-finger fat swipe to further select one of the images displayed on the display section 120.

For example, in FIG. 12(b), the user can display the image PIC1 of the images PIC1 and PIC2 on the entire screen or display the image PIC2 on the entire screen.

So far, the case where the user selects one of the images displayed on the regions of both sides in the screen of the display section 120 has been described with reference to FIG. 12.

Figure 13:
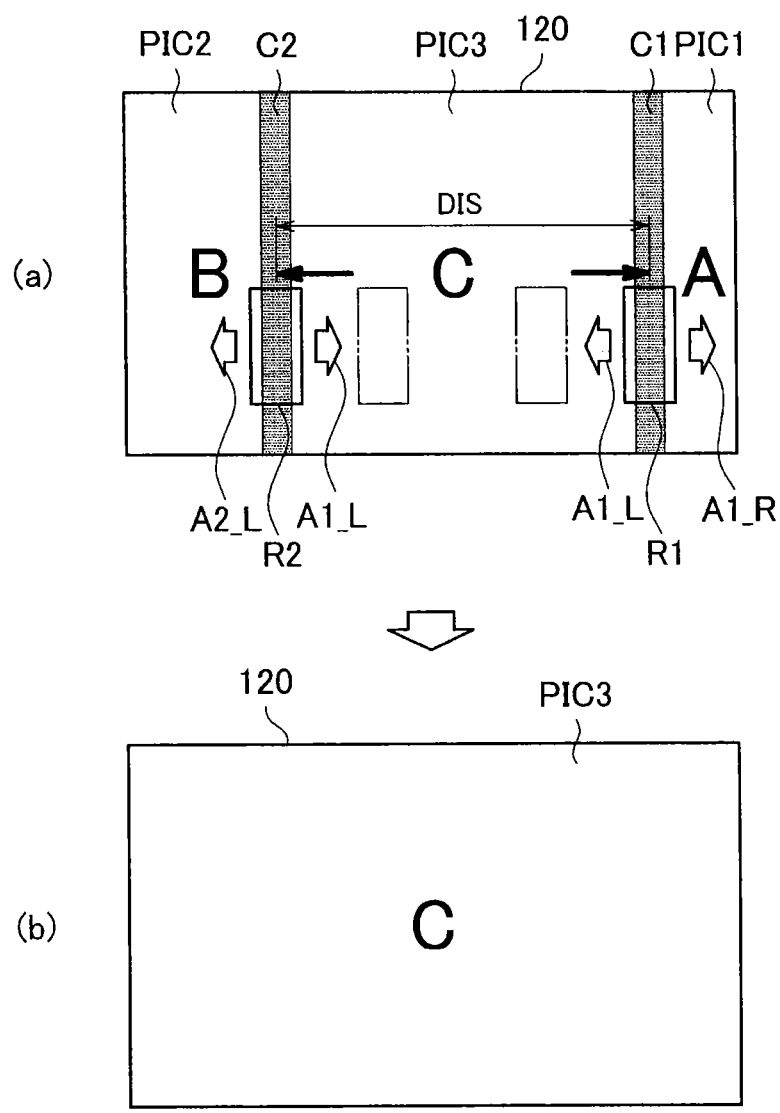
FIG. 13 is an explanatory diagram for describing a screen switching according to a first modification of the same embodiment.

Next, a case where the user selects the image (for example, the image PIC3 of FIG. 12) displayed between the cursors C1 and C2 will be described with reference to FIG. 13.

In this case, the user moves either or both of the first operating body and the second operating body such that the first operating body and the second operating body are far away from each other.

As a result, in a case where the distance DIS between the first operating body and the second operating body is greater than or equal to the predetermined threshold value, the fat swipe mode execution section 114 determines that the image (in FIG. 13(a), the image PIC3) displayed between the first operating body and the second operating body has been selected. In this case, the display control section 119 of the fat swipe mode execution section 114 displays the image displayed between the first operating body and the second operating body on the entire screen of the display section 120.

So far, the case where the user selects the image displayed between the cursors C1 and C2 has been described with reference to FIG. 13.

[3-3: Example of Operating Direction in Two-Finger Fat Swipe (FIG. 14)]

As described above, in the one-finger fat swipe, it is possible to perform the display control according to the direction in which the user touches the operating body. Also, in the two-finger fat swipe, it is possible to perform the display control according to the direction in which the user touches the two operating bodies (the first operating body and the second operating body).

For example, a case where the user performs the two-finger fat swipe by touching the two operating bodies on the display section 120 such that the second operating body is perpendicular to the first operating body is considered. In this case, the longitudinal direction of the first operating body coincides with the transverse direction of the second operating body.

In the following, the two-finger fat swipe mode in a case where the first operating body and the second operating body have a perpendicular position relationship will be described briefly with reference to FIG. 14. FIG. 14 is an explanatory diagram for describing an example of the operating direction in the present modification.

As illustrated in FIG. 14(a), the one-finger fat swipe mode is executed when the user touches the first operating body on the display section 120.

In this state, the user touches the second operating body in a direction perpendicular to the first operating body. The operating body position/shape specification section 104 specifies the positions and shapes of the first operating body and the second operating body. The display control section 119 of the fat swipe mode execution section 114 performs the display control of the display section 120, based on the specified locations and shapes.

FIG. 14(*b*) is the screen display example of the display section 120 in the two-finger fat swipe mode. In a case where the longitudinal direction of the first operating body and the second operating body have a perpendicular position relationship, as illustrated in FIG. 14(*b*), the cursor C1 corresponding to the first operating body and the cursor C2 corresponding to the second operating body also have a perpendicular position relationships.

Therefore, the display control section 119 preferentially displays the cursor C1 continuously displayed from the execution of the one-finger fat swipe mode. When the two-finger fat swipe is executed, the display control section 119 displays the cursor C2 such that the screen region divided by the cursor C1 is further sub-divided, and displays the images PIC2 and PIC3 with the cursor C2 as the boundary.

For example, as illustrated in FIG. 14(*b*), the division in the two-finger fat swipe can be performed in the region where the second operating body is touched among the regions divided in the one-finger fat swipe mode.

4: Second Modification 1.5-Finger Fat Swipe; FIGS. 15 and 16

So far, the one-finger fat swipe performed by one operating body and the two-finger fat swipe performed by two operating bodies have been described. In the following, a second modification related to 1.5-finger fat swipe will be described with reference to FIGS. 15 and 16. FIGS. 15 and 16 illustrate screen display examples according to the present modification.

In the 1.5-finger fat swipe, the operation is performed by two operating bodies. However, unlike the two-finger fat swipe, the one-finger fat swipe is performed by one operating body and the normal operation is performed by the other operating body.

The technology of the 1.5-finger fat swipe mode is an application of the technology of the one-finger fat swipe mode which is the technology associated with the one-finger fat swipe.

As illustrated in FIG. 15(*a*), the user performs the one-finger fat swipe by one operating body (first operating body), and the fat swipe mode execution section 114 executes the one-finger fat swipe mode.

In the one-finger fat swipe, the cursor C1 corresponding to the direction of the operating body is displayed, the screen of the display section 120 is divided with the position of the cursor C1 as the boundary, and the images PIC1 and PIC2 is displayed on the divided screens, respectively.

In this state, the user performs the normal operation by the second operating body. As illustrated in FIG. 15(*b*), the user performs the normal operation by the second operating body, on one screen among the screens of the display section 120 divided in the one-finger fat swipe mode.

When the second operating body is touched, the fat swipe mode execution section 114 performs the switching from the one-finger fat swipe to the 1.5-finger fat swipe mode.

FIG. 15(*b*) illustrates a screen display example of a case where the user performs the operation by the second operating body on the screen where the image PIC2 is displayed in FIG. 15(*a*).

The example illustrated in FIG. 15(*b*) is a screen display example of a case where the operating direction of the first operating body is perpendicular to the operating direction of the second operating body.

Also, in the example illustrated in FIG. 16, a screen display example during the execution of the one-finger fat swipe mode is illustrated in (a), and a screen display example during the execution of the 1.5-finger fat swipe mode is illustrated in (b).

However, a screen display example during the execution of the 1.5-finger fat swipe mode is illustrated. However, in FIG. 16, a screen display example of a case where the operating direction of the first operating body coincides with the operating direction of the second operating body is illustrated.

So far, the second modification of the present embodiment has been described with reference to FIGS. 15 and 16.

5: Third Modification

One-Finger Twist Fat Swipe; FIG. 17

In the following, a third modification related to one-finger fat swipe will be described with reference to FIG. 17. FIG. 17 illustrates a screen display example according to the present modification.

In the one-finger twist fat swipe, the operation is performed by widely touching one operating body on the display section 120. However, unlike the one-finger fat swipe in which the operation is performed by moving the operating body in parallel on the screen of the display section 120, the one-finger twist fat swipe is performed by twisting the operating body on the screen of the display section 120.

The technology of the one-finger twist fat swipe mode is an application of the technology of the one-finger fat swipe mode which is the technology associated with the one-finger fat swipe.

Also, when the operating body is twisted beyond a predetermined value during the execution of the one-finger fat swipe mode, the fat swipe mode execution section 114 may execute the one-finger twist fat swipe mode.

As illustrated In FIG. 17(*a*), even in the one-finger twist fat swipe mode, like the case of the one-finger fat swipe mode, the display control section 119 displays the cursor C1 according to the direction in which the operating body is touched on the display section 120.

Also, the display control section 119 displays images on the screens of the display section 120 divided with the position of the cursor as the boundary. Also, the display control section 119 displays an arrow A1 indicating the direction in which the operating body can be twisted.

When the user performs the twist fat swipe, that is, when the user twists the operating body touched on the display section 120, the display control section 119 displays a new image (images PIC3 or image PIC4) stepwise as illustrated in FIG. 17(*b*).

By displaying the image stepwise as described above, it is possible to display the image associated with a desired function or the like by an intuitive motion as if the user unfolds a fan.

The information processing apparatus 10 waits until the user selects the function, while focusing on the function or the like associated with the image displayed last among the displayed images.

The display control section 119 gives a color different from the other images to an image being selected, for example, like the image PIC4 of FIG. 17(b), so as to indicate the focus on the image displayed last (in other words, a predetermined function associated with the image) among the displayed images, and allows the user to confirm the images.

As a method of emphasizing the focused image, except for the method of giving a color different from the other images to the image being selected, a different transparency may be given to the other images other than the image being selected, or the image being selected may be surrounded with a thick line.

When the user separates the operating body from the display section 120 in a state of focusing on a certain image, the information processing apparatus 10 recognizes that the user has selected the function or the like associated with that image, and performs the relevant function or the like.

On the other hand, when the user further twists the operating body in such a state as illustrated in FIG. 17(b), the display control section 119 displays an image PIC5 associated with another function as illustrated in FIG. 17(c) and gives focus.

When the user returns the twist of the operating body and separates the operating body from the display section 120, the focus is cancelled.

So far, the third modification of the present embodiment has been described with reference to FIG. 17.

6: Fourth Modification 1.5-Finger Twist Fat Swipe; FIG. 18

In the following, a fourth modification related to 1.5-finger twist fat swipe will be described with reference to FIG. 18. FIG. 18 illustrates a screen display example according to the present modification.

In the 1.5-finger twist fat swipe, the operation is performed by two operating bodies. However, unlike the two-finger fat swipe or the 1.5-finger fat swipe, the one-finger twist fat swipe is performed by one operating body (first operating body) and the normal operation is performed by the other operating body (second operating body).

The technology of the 1.5-finger twist fat swipe mode is an application of the technology of the one-finger fat swipe mode which is the technology associated with the one-finger twist fat swipe.

As illustrated in FIG. 18, the 1.5-finger twist fat swipe mode can further open another image (in the example of FIG. 18, image PIC5) by the second operating body and select the image by tapping, in addition to the image displayed by the first operating body while the one-finger twist fat swipe mode is executed by the first operating body.

As described above, the 1.5-finger twist fat swipe, which is a combination of the one-finger twist fat swipe and the normal operation, can select and execute many kinds of functions by the intuitive operation with fewer steps.

So far, the fourth modification of the present embodiment has been described with reference to FIG. 18.

7: Application Example

The technology of the various fat swipes can be applied to various information processing apparatuses 10. Also, the fat swipes make it possible to consider various operations of the information processing apparatuses 10 which can be performed by the user. In the following, as application examples, some examples will be described.

[7-1: Application Example of Application Switching (FIGS. 19 to 22)]

In the following, an application example in which the technology related to the basic configuration and the modification is applied to the switching of the screen associated with the application will be described with reference to FIGS. 19 to 22. FIGS. 19 to 22 are explanatory diagrams for describing application examples of the present embodiment.

(FIG. 19)

Figure 19:
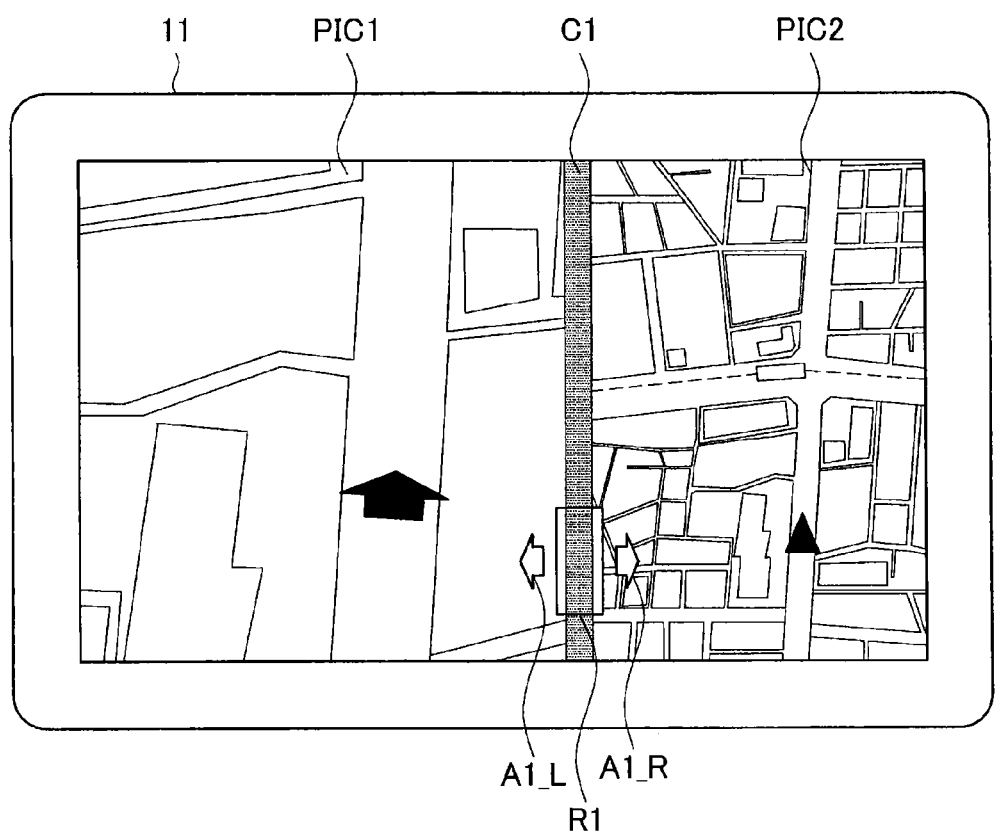
FIG. 19 is an explanatory diagram for describing an application example of the same embodiment.

FIG. 19 illustrates an example of switching an image PIC1 associated with an application for displaying a detailed map and an image PIC2 associated with an application for displaying a wide-area map in an apparatus 11 having a navigation function.

As the image PIC1 associated with the application for displaying the detailed map, an image displaying a part of the detailed map is illustrated in FIG. 19.

Also, similarly, as the image PIC2 associated with the application for displaying the wide-area map, an image displaying a part of the wide-area map is illustrated in FIG. 19.

For example, while the user drives a car, if the user performs the fat swipe with a hand opposite to a hand driving the car, the switching between the detailed map and the wide-area map can be smoothly performed.

Also, in addition to the map switching in the apparatus 11 having the navigation function, an enlarged or reduced image of the image displayed on one side of the operating body can be displayed on the other side of the operating body.

(FIG. 20)

Figure 20:
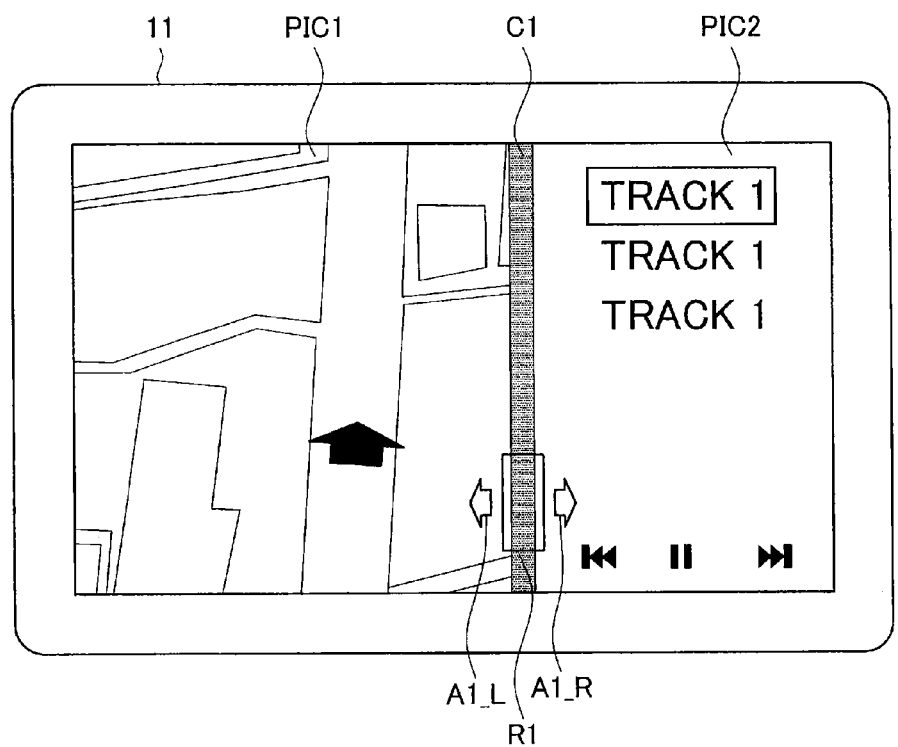
FIG. 20 is an explanatory diagram for describing an application example of the same embodiment.

FIG. 20 illustrates an example of switching an image PIC1 associated with an application for performing navigation and an image PIC2 associated with an application for reproducing music in an apparatus 11 having a navigation function.

For example, the user generally displays a map on an entire screen and drives a car while viewing the map. Also, a situation in which the user listens to music by executing an application for reproducing music while executing an application for performing navigation can be considered.

In a case where the user performs the operation of the application for reproducing music, for example, a choice, reproduction, or stop of music, the screen switching can be performed by a simple operation such as the fat swipe.

(FIG. 21)

Figure 21:
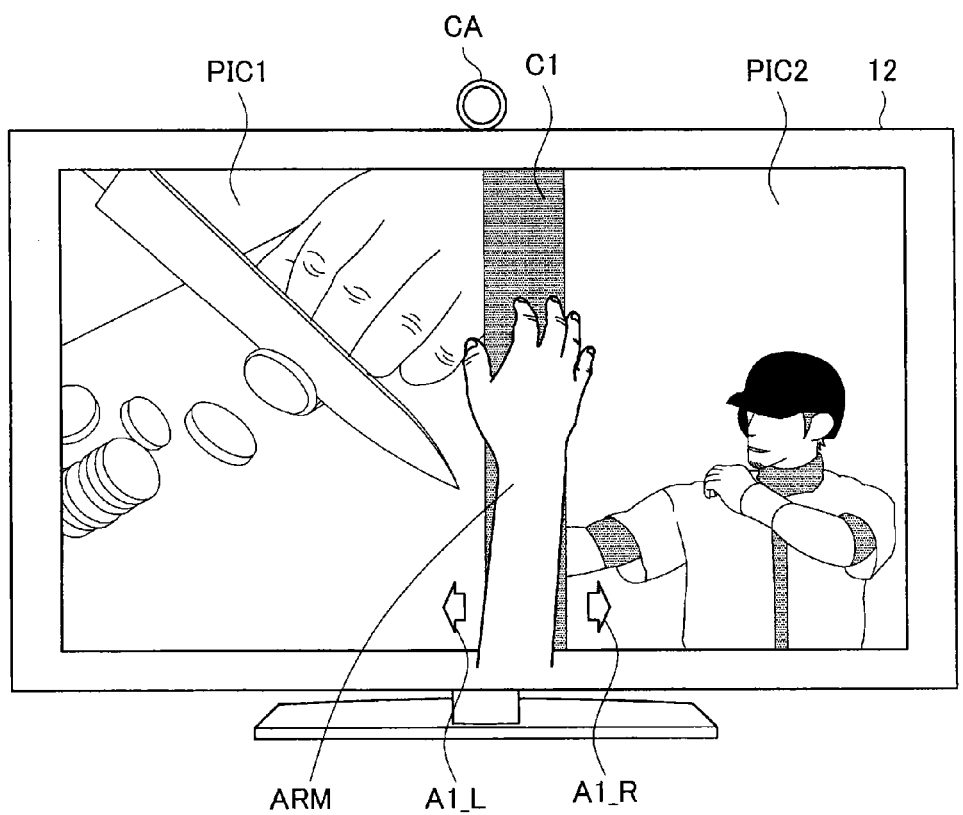
FIG. 21 is an explanatory diagram for describing an application example of the same embodiment.

The technology of the present embodiment can also be applied to a screen switching of a display device 12 such as a television. As in the display device 12, in a case where it is difficult for the user to directly touch the screen of the device, the operation of the user can be detected by object recognition by, for example, installing a camera CA in the device as illustrated in FIG. 21.

Due to the object recognition, the display control section 119 recognizes the operating body such as a user's arm ARM and displays a cursor C1 at a position on a screen which is indicated by the operating body. For example, the display control section 119 displays a television program as an image PIC1 and displays a television program different from the image PIC1 as an image PIC2.

Figure 22:
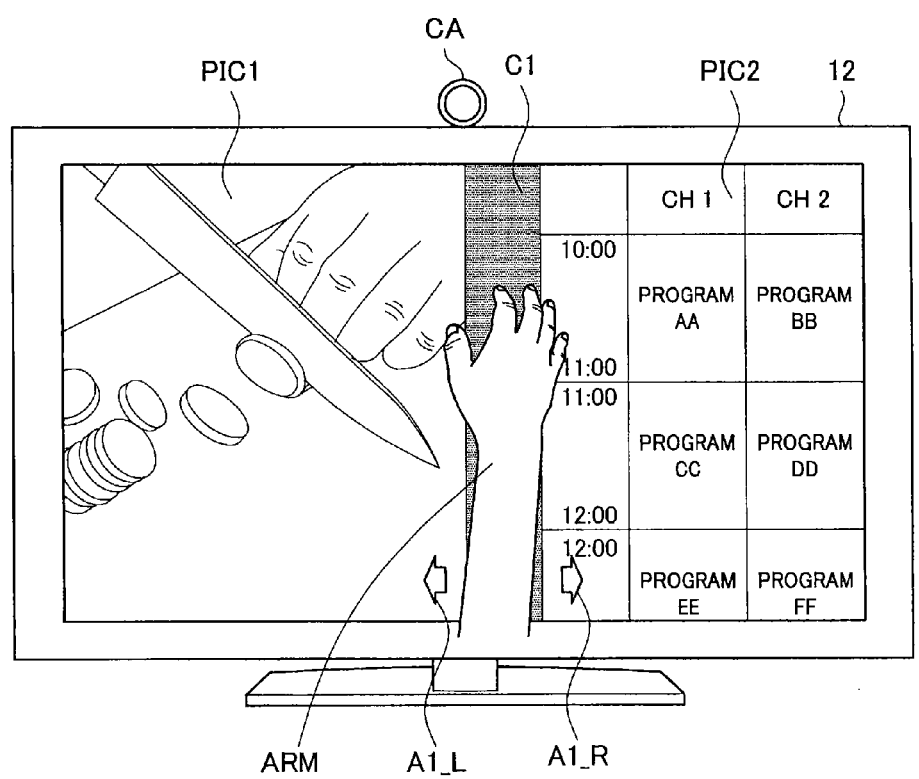
FIG. 22 is an explanatory diagram for describing an application example of the same embodiment.

As a result, the user can temporarily display another television program while watching a certain television program and can switch a television program displayed on the display section 120.
(FIG. 22)

Also, in the display device 12 such as a television, the display control section 119 can display a moving picture such as a television program on one screen divided by the cursor C1 and display information on a program guide on the other screen.

So far, the application example in which the technology related to the basic configuration and the modification is applied to the switching of the screen associated with the application has been described with reference to FIGS. 19 to 22.

[7-2: Application Example of Mode Switching (FIGS. 23 and 24)]

Figure 23:
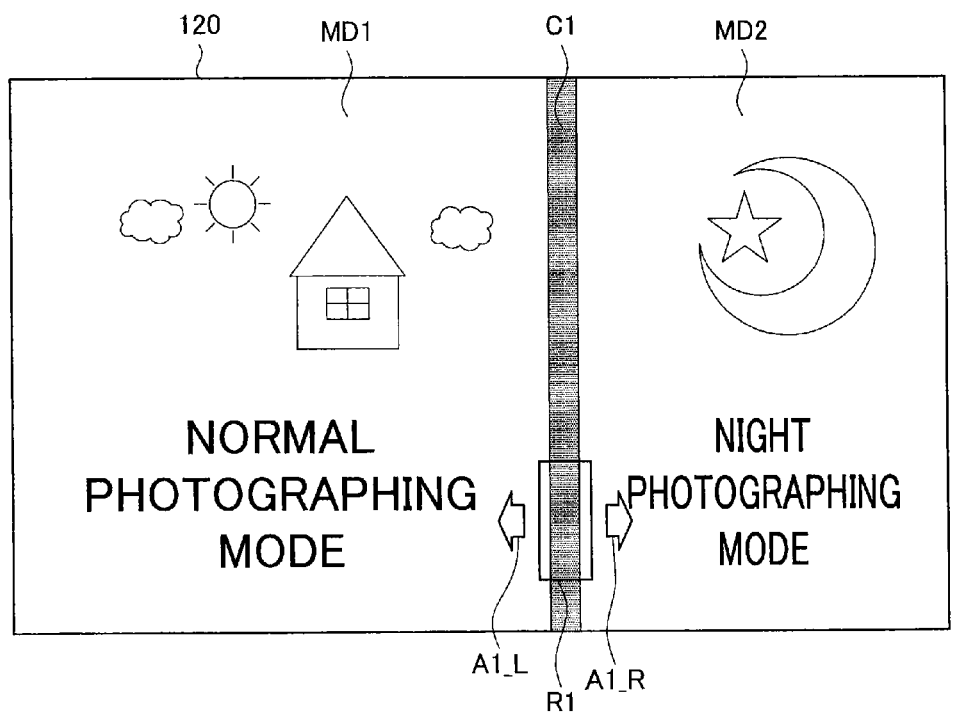
FIG. 23 is an explanatory diagram for describing an application example of the same embodiment.
Figure 24:
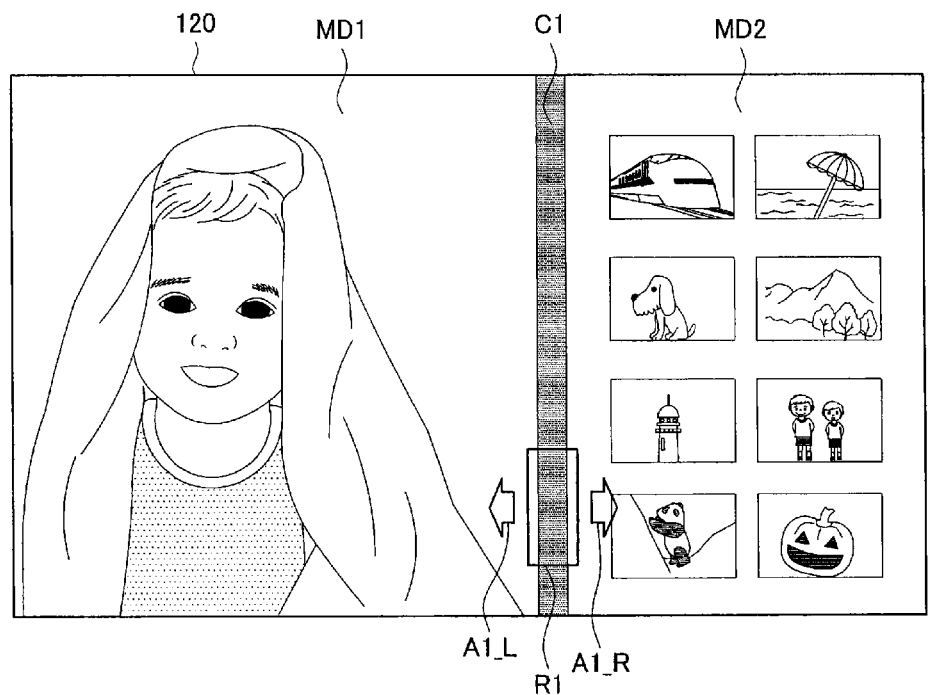
FIG. 24 is an explanatory diagram for describing an application example of the same embodiment.

In the following, an application example in which the technology related to the basic configuration and the modification is applied to the mode switching will be described with reference to FIGS. 23 and 24. FIGS. 23 and 24 are explanatory diagrams for describing application examples of the present embodiment.
(FIG. 23)

For example, in an imaging apparatus having a plurality of photographing modes, the use of the fat swipe can perform the mode switching through an intuitive operation with less operation steps.

For example, as illustrated in FIG. 23, a switching between a normal photographing mode MD1 and a night photographing mode MD2 is performed by the user.
(FIG. 24)

Also, for example, in the imaging apparatus, a switching between a photographing mode MD1 and a reproducing mode MD2 can be performed.

By using the technology related to the fat swipe, the user can instantly switch a photographing mode for photographing a subject and a reproducing mode for allowing the user to confirm a previously photographed image.

As a result, for example, when the user wants to photograph a subject while executing the reproducing mode to confirm a previously photographed image, the user can photograph a subject by instantly switching to the photographing mode without missing a shutter chance.

So far, the application example in which the technology related to the basic configuration and the modification is applied to the mode switching has been described with reference to FIGS. 23 and 24.

[7-3: Application Example of Setting of Parameter Values (FIGS. 25 to 28)]

In the following, an application example in which the technology related to the basic configuration and the modification is applied to the setting of parameter values will be described with reference to FIGS. 25 to 28.
(FIG. 25)

Figure 25:
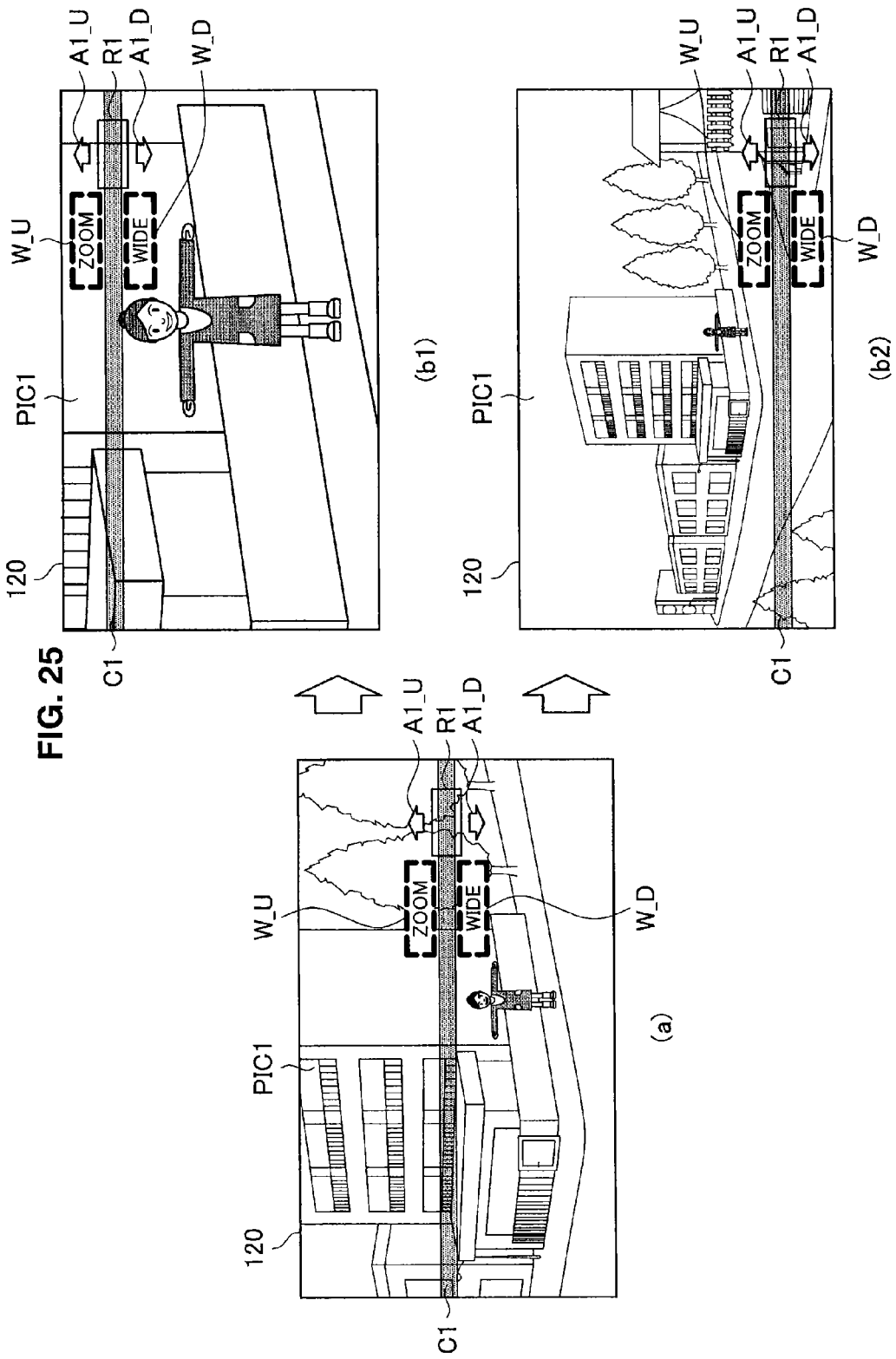
FIG. 25 is an explanatory diagram for describing an application example of the same embodiment.

FIG. 25 illustrates an example in which the user performing photographing with the imaging apparatus executes a zoom adjustment by performing a fat swipe on a preview screen. For example, when the user performs the touch with the intention of the fat swipe, as illustrated in FIG. 25(*a*), the display control section 119 superimposes and displays an arrow A1_U or A1_D, indicating a direction in which the user can move the operating body, on a photographed image PIC1.

Also, for example, the display control section 119 performs a text display W_U indicating an operation (for example, zoom) of the imaging apparatus which is associated with a case where the operating body is moved in a direction indicated by an arrow A1_U of one side. Also, for example, the display control section 119 performs a text display W_D indicating an operation (for example, wide) of the imaging apparatus which is associated with a case where the operating body is moved in a direction indicated by an arrow A1_D of the other side.

FIG. 25(*b*) illustrates a case where the user moves the operating body in the direction indicated by the arrow A1_U in FIG. 25(*a*) and thus the zoomed photographed image PIC1 is displayed.

Also, FIG. 25(*c*) illustrates a case where the user moves the operating body in the direction indicated by the arrow A1_D in FIG. 25(*a*) and thus the wide photographed image PIC2 is displayed.

The user can perform the fat swipe without moving the line of sight from the photographed image PIC1 displayed on the preview screen, and can prevent the shutter chance from being missed because a long time is taken to adjust the zoom.

Incidentally, in addition to the application to the preview screen of the imaging apparatus, the zoom adjustment function can also be applied to the display control in various apparatuses. Also, instead of the text display indicating the operation of the imaging apparatus, an icon or the like may be displayed.
(FIG. 26)

Figure 26:
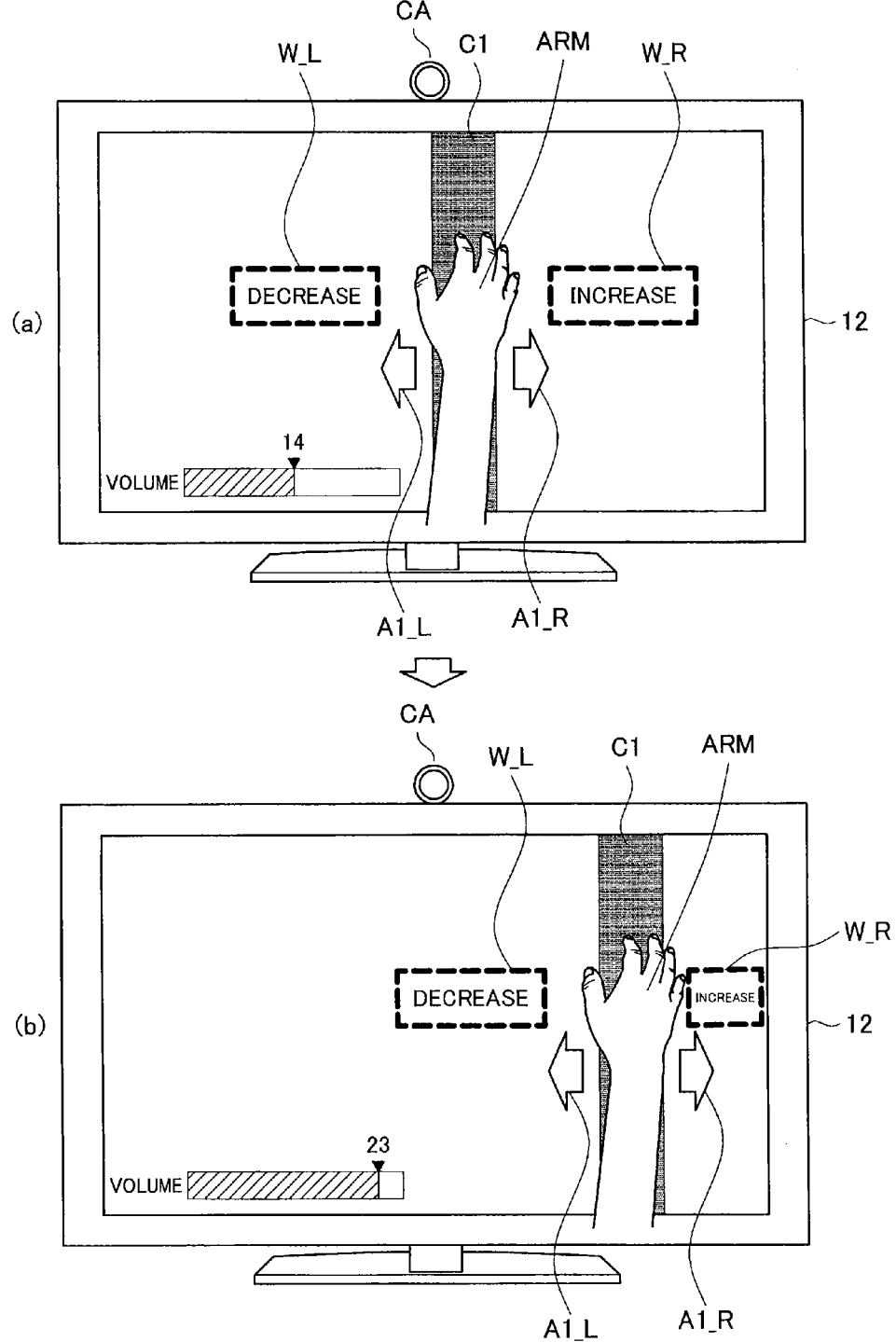
FIG. 26 is an explanatory diagram for describing an application example of the same embodiment.

As in the example illustrated in FIG. 26, the display device 12 or the like can be configured to perform a volume control. In FIG. 26(*a*), the object recognition is performed in such a manner that the camera CA of the display device 12 catches the arm ARM of the user which is held up in front of the display device 12.

For example, when the user moves from a position of the arm ARM illustrated in FIG. 26(*a*) to a position of the arm ARM illustrated in FIG. 26(*b*), the display device 12 increases a volume according to the motion.
(FIGS. 27 and 28)

Figure 27:
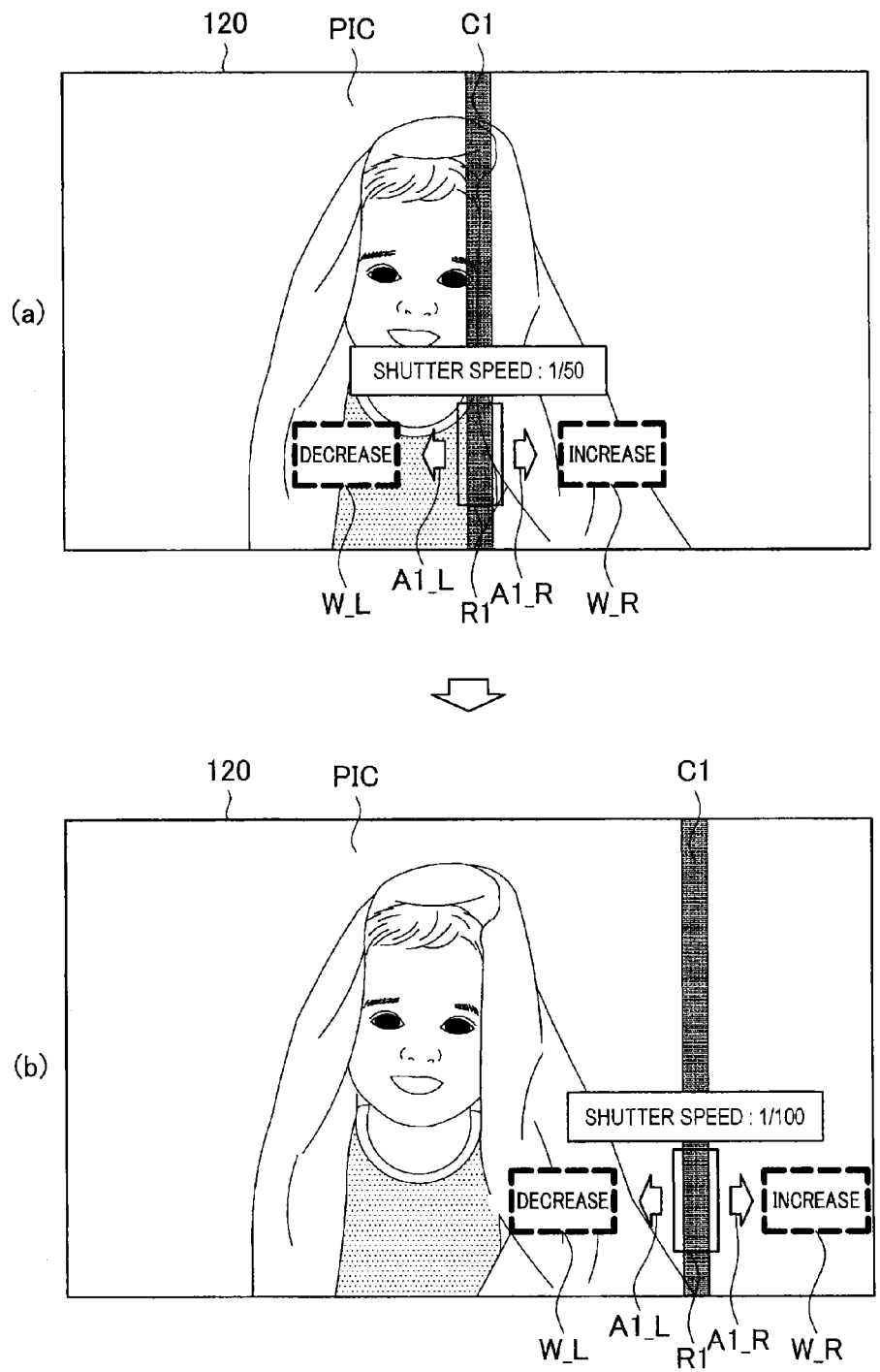
FIG. 27 is an explanatory diagram for describing an application example of the same embodiment.
Figure 28:
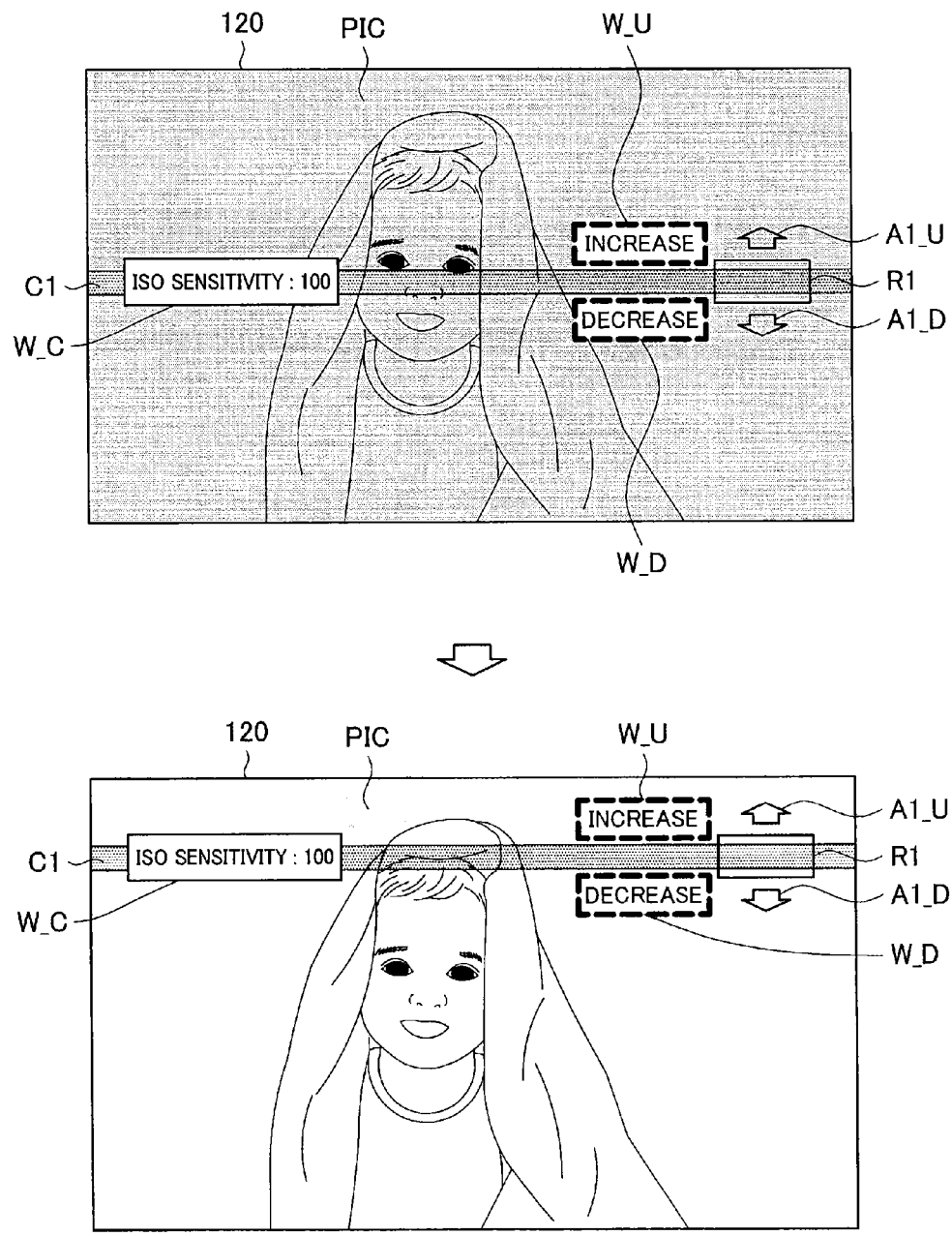
FIG. 28 is an explanatory diagram for describing an application example of the same embodiment.

As in the example illustrated in FIG. 27, when the parameter values such as a shutter speed are adjusted in the imaging apparatus, the technology related to the present embodiment can also be applied. For example, after the fat swipe mode is started as illustrated in FIG. 27(*a*), the user moves the operating body in a direction of increasing the shutter speed as illustrated in FIG. 27(*b*).

Incidentally, it is considered that the currently set parameter values are displayed as illustrated in FIG. 27. In the example of FIG. 27, in a case where the shutter speed is $\frac{1}{50}$ as illustrated in FIG. 27(*a*), if the user performs the fat swipe for increasing the shutter speed, the shutter speed is adjusted to $\frac{1}{100}$ as illustrated in FIG. 27(*b*).

Also, in various information processing apparatuses 10, it is considered that when a plurality of parameters can be set, moving directions of different operating bodies are allocated to different parameters. The user touches the operating body on the display section 120 in a predetermined direction associated with a parameter to be adjusted, and moves the operating body in the predetermined direction.

For example, as illustrated in FIG. 27, the imaging apparatus adjusts the shutter speed when the imaging apparatus detects the touch of the operating body in a transverse direction of the display section 120 and detects the motion of the operating body in a longitudinal direction of the display section 120. On the other hand, as illustrated in FIG. 28, ISO sensitivity is adjusted when the touch of the operating body in a longitudinal direction of the display section 120 is detected and the motion of the operating body in a transverse direction of the display section 120 is detected.

So far, the application example in which the technology related to the basic configuration and the modification is applied to the parameter switching has been described with reference to FIGS. 25 to 28.

[7-4: Application Example of Page Move Operation (FIGS. 29 and 30)]

Figure 30:
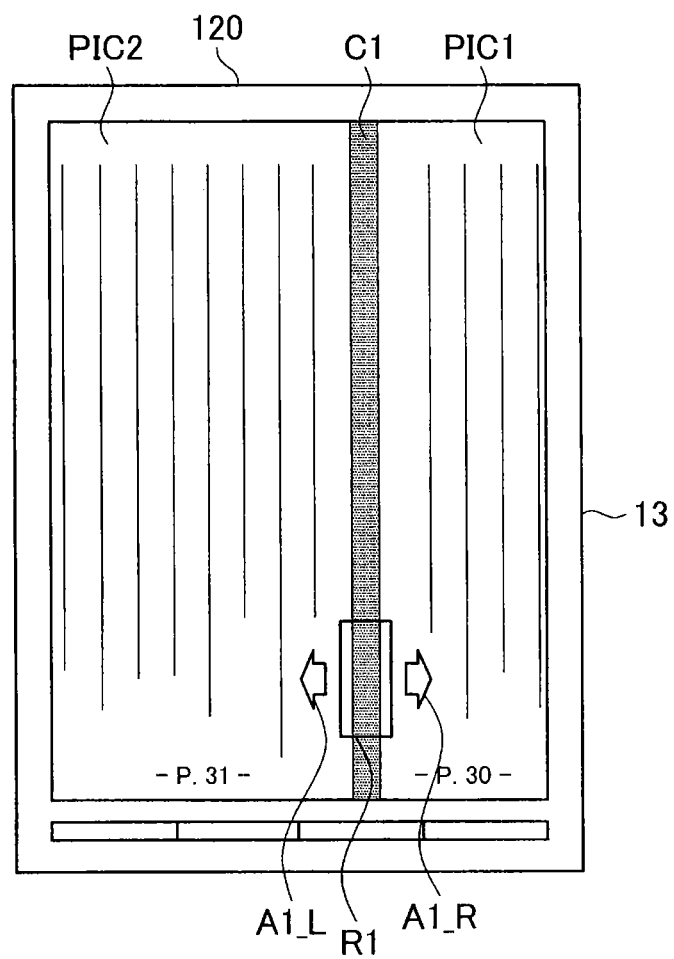
FIG. 30 is an explanatory diagram for describing an application example of the same embodiment.

In the following, an application example in which the technology related to the basic configuration and the modification is applied to the page move operation will be described with reference to FIGS. 29 and 30.

(FIG. 29)

For example, as illustrated in FIG. 29, the technology according to the present embodiment can also be applied to a page move operation on a screen such as a web browser or the like. For example, in a situation in which an image PIC2 associated with a certain page is displayed, in a case where a fat swipe is started by a user, as illustrated in FIG. 29(a), the display control section 119 displays an arrow A1_L in one direction of a transverse direction of the operating body, displays an arrow A1_R in the other direction, and shows that the motion in the transverse direction of the operating body is possible.

Also, it is considered that the display control section 119 displays a text display W_L associated with an operation such as "previous page" on one side of the operating body, and displays a text display W_R associated with an operation such as "next page" on the other side of the operating body.

For example, as illustrated in FIG. 29(b), when the user moves the operating body in a direction in which the text display W_L associated with the operation such as "previous page" is displayed, the display control section 119 displays the image PIC1 previously browsed before the browsing of the image PIC2, as well as the currently displayed image PIC2. The user can perform the switching of the images PIC1 and the PIC2 by the fat swipe.

Also, as illustrated in FIG. 29(c), when the user moves the operating body in a direction in which the text display W_R associated with the operation such as "next page" is displayed, the display control section 119 displays the image PIC3 previously browsed before the browsing of the image PIC2, as well as the currently displayed image PIC2. The user can perform the switching of the images PIC2 and the PIC3 by the fat swipe.

(FIG. 30)

Also, it is possible to apply to a page switching of a book reader 13 or the like. For example, when an image PIC1 associated with a certain page is displayed, it is possible to realize a user interface that switches to an image PIC2 associated with a next page when the user performs the fat swipe.

According to the above configuration, the user can move to an image associated with a previous or next page while confirming an image associated with a certain page.

So far, the application example in which the technology related to the basic configuration and the modification is applied to the page move operation has been described with reference to FIGS. 29 and 30.

[7-5: Application Example of Additional Information Provision (FIGS. 31 and 32)]

When a certain image PIC1 is displayed, information on the image PIC1 can be additionally displayed as an image PIC2 by using the technology according to the present embodiment.

Figure 31:
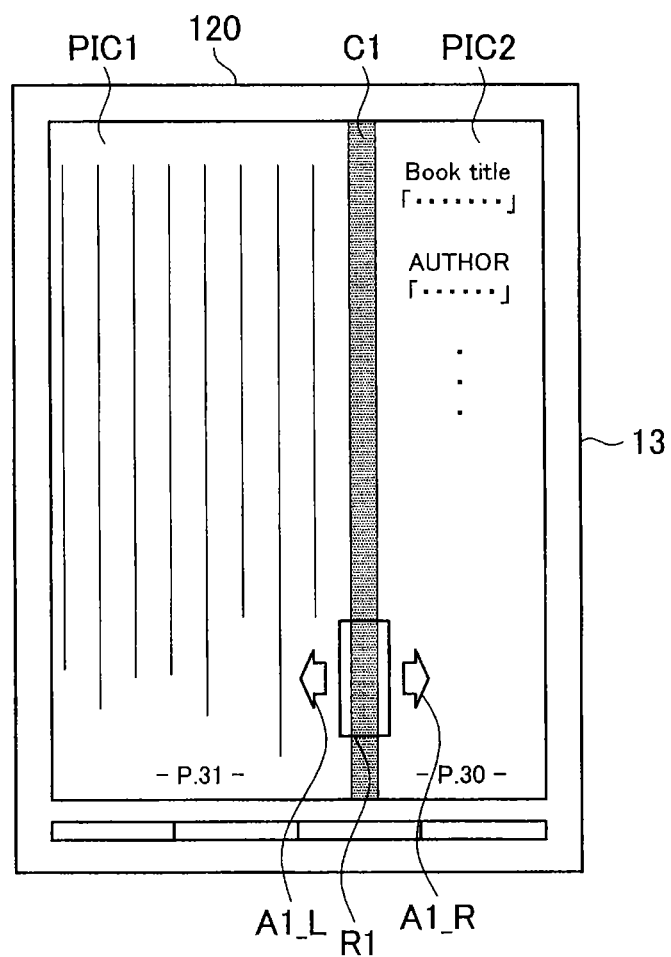
FIG. 31 is an explanatory diagram for describing an application example of the same embodiment.

For example, an example of a book reader 13 of FIG. 31 illustrates an image PIC2 displaying information on a title or author of an electronic book, together with an image PIC1 displaying a body of an electronic book.

Figure 32:
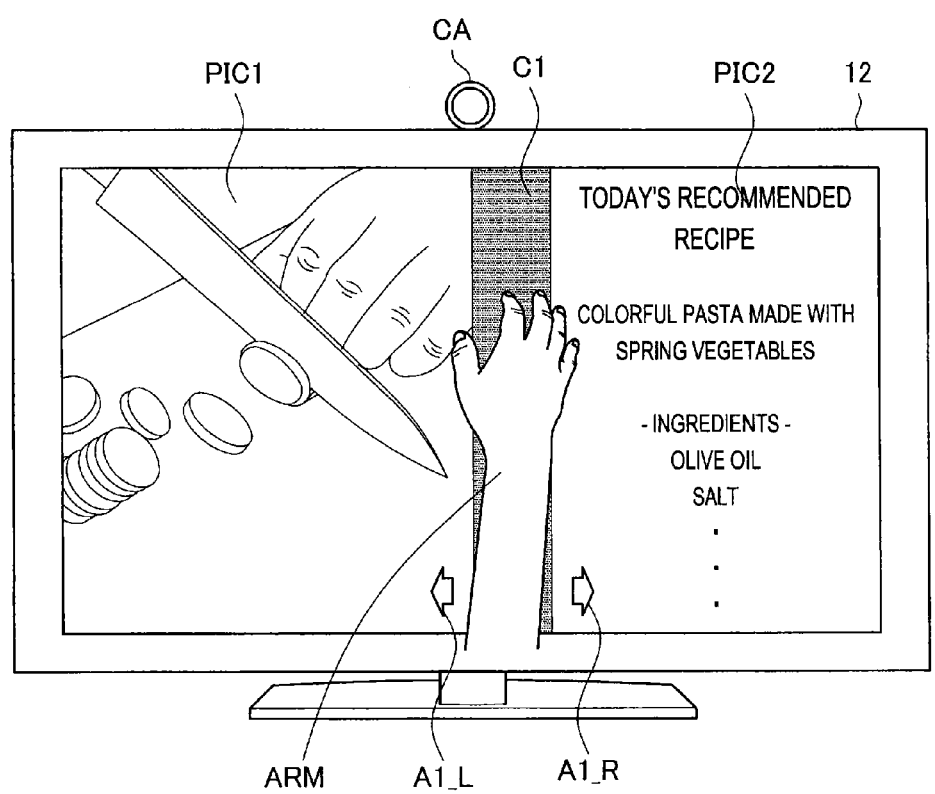
FIG. 32 is an explanatory diagram for describing an application example of the same embodiment.

Also, for example, in an example of a display device 12 of FIG. 32, additional information is displayed as an image PIC2, together with an image PIC1 of a television program. For example, as illustrated in FIG. 32, when the user wants additional information on cooking ingredients picked up in a cooking program while watching the cooking program, the user can operate the display device 12 by moving the arm ARM and acquire the additional information.

[7-6: Application Example of Game (FIG. 33)]

The technology according to the present embodiment can also be applied to games. For example, as illustrated in FIG. 33, it is considered that an expression of a character displayed stepwise on the screen is changed whenever the fat swipe is performed.

Figure 33:
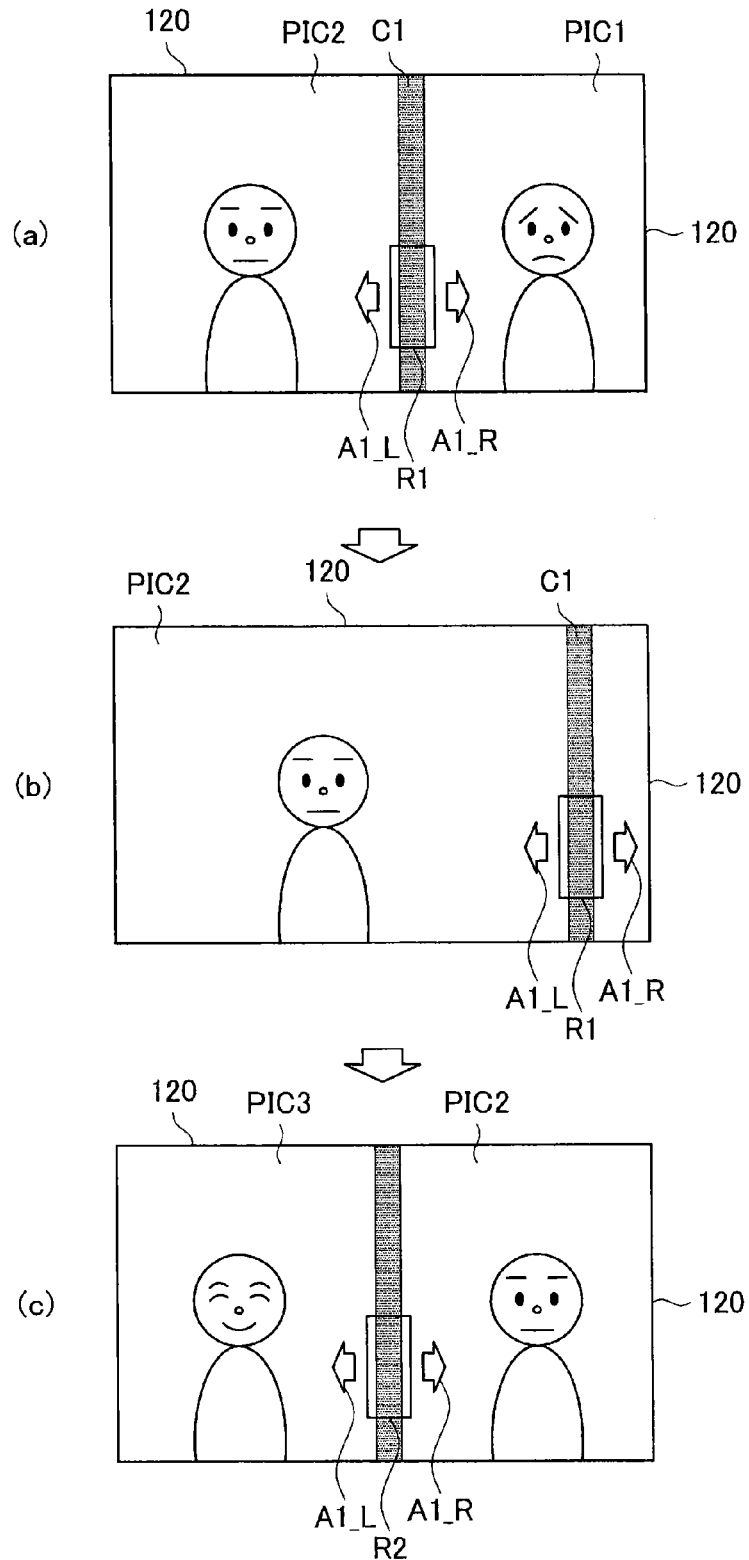
FIG. 33 is an explanatory diagram for describing an application example of the same embodiment.

In the example of FIG. 33, the character gradually smiles from FIG. 33(a) to FIG. 33(c).

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

8. Summary

Finally, the technical idea of the present embodiment is summarized briefly. The technical idea described in the following can be applied to various information processing apparatuses, such as PCs, mobile phones, portable game machines, mobile information terminals, information appliances, and car navigation systems.

For example, the information processing apparatus expressed as the following (1) enables more intuitive operation in consideration of a direction of an operating body.

A longitudinal direction of the operating body can take an arbitrary direction and can be determined in a direction desired by a user. According to the information processing apparatus expressed as the following (1), more specifically, the operation can be performed based on the direction of the operating body to which the user's intention is reflected.

(1)

An information processing apparatus including:

an operating body direction detection section configured to detect a longitudinal direction of an operating body; and an operating direction determination section configured to allocate a command to a direction with reference to the longitudinal direction of the operating body.

(2)

The information processing apparatus according to (1), wherein the operating direction determination section allocates a different command to each of a plurality of directions with reference to the longitudinal direction of the operating body.

(3)

The information processing apparatus according to (1) or (2), further including:

a display control section configured to display a first display object that indicates the longitudinal direction of the operating body.

(4)

The information processing apparatus according to (3), wherein the display control section displays a second display object that indicates a direction with reference to the longitudinal direction of the operating body.

(5)

The information processing apparatus according to (3) or (4), wherein the display control section divides and displays a screen region, with a position of the operating body as a boundary and along the longitudinal direction of the operating body.

(6)

The information processing apparatus according to (5), wherein the display control section adjusts a ratio of the screen region with respect to an entire screen according to either or both of the position and motion of the operating body.

(7)

The information processing apparatus according to any one of (1) to (6), further including:

an aspect ratio calculation section configured to calculate an aspect ratio of a region of operation by the operating body, wherein the longitudinal direction of the operating body is calculated based on the aspect ratio of the region.

(8)

The information processing apparatus according to any one of (1) to (7), wherein the operating body direction detection section detects a longitudinal direction of each of a plurality of operating bodies, and wherein the operating direction determination section allocates a command to a direction with reference to the longitudinal direction of each of the operating bodies.

(9)

The information processing apparatus according to (7), wherein the aspect ratio calculation section calculates an aspect ratio of a region corresponding to each of the plurality of operating bodies, wherein the operating body direction detection section detects a longitudinal direction of the operating body, of which the aspect ratio of the region of operation is within a predetermined range, among the operating bodies, and wherein the operating direction determination section allocates a command to a direction with reference to the longitudinal direction of the operating body.

(10)

The information processing apparatus according to any one of (1) to (9), further including:

an operation detection section configured to detect a position of an operating body that is in contact or close proximity with the operating body.

(11)

An information processing method including:

detecting a longitudinal direction of an operating body; and allocating a command to a direction with reference to the longitudinal direction of the operating body.

(12)

A program for causing a computer to execute:

an operating body direction detection function of detecting a longitudinal direction of an operating body; and an operation direction determination function of allocating a command to a direction with reference to the longitudinal direction of the operating body.

(Remarks)

The operating body position/shape specification section 104 is an example of an operating body shape specification section. Also, the arrow displayed on the display section 120 is an example of a second display object. Also, the cursor displayed on the display section 120 is an example of a first display object.

REFERENCE SIGNS LIST 10 information processing apparatus
102 operation detection section
104 operating body position/shape specification section
116 operating body direction detection section
118 operating direction determination section
119 display control section

The invention claimed is:

1. An information processing apparatus comprising:
circuitry configured to:
    detect a longitudinal direction of a first operating body;
    allocate a first command to a direction with reference to the longitudinal direction of the first operating body;
    generate a first image related to the first command upon contact of the first operating body with a display at a first location, wherein the first image is displayed in a first screen region that is separated from a second screen region by a boundary within the display, with a position of the first operating body at the first location as the boundary and along the longitudinal direction of the first operating body; and
    perform an operation upon separation of the first operating body from the display, wherein the operation is based on a location of the first operating body on the display when the first operating body is initially separated from the display following the contact of the first operating body with the display at the first location, and
    wherein, when the first operating body is moved without separation from the display from the first location to a second location that is different from the first location, and separated from the display at the second location, the operation is an activation of the first command or an activation of a second command, and
    generate a second image upon contact of a second operating body with the display at third location, wherein the second image is displayed in a third screen region that is separated from the first screen region and the second screen region by a plurality of boundaries within the display, and wherein a location and area of the third screen region is based on an orientation of a longitudinal direction of the second operating body on the display.

2. The information processing apparatus according to claim 1,
wherein the circuitry is further configured to allocate a different command to each of a plurality of directions with reference to the longitudinal direction of the first operating body.

3. The information processing apparatus according to claim 1,
wherein the circuitry is further configured to display a first display object that indicates the longitudinal direction of the first operating body.

4. The information processing apparatus according to claim 3, wherein the circuitry is further configured to display a second display object that indicates a direction with reference to the longitudinal direction of the first operating body.

5. The information processing apparatus according to claim 1,
wherein the circuitry is further configured to adjust ratio of the first screen region with respect to an entire screen according to either or both of the position and motion of the first operating body.

6. The information processing apparatus according to claim 1,
wherein the circuitry is further configured to calculate an aspect ratio of a region of operation by the first operating body, wherein the longitudinal direction of the first operating body is calculated based on the aspect ratio of the region.

7. The information processing apparatus according to claim 1, wherein the circuitry is further configured to:
detect a longitudinal direction of each of a plurality of operating bodies, and
allocate a command to a direction with reference to the longitudinal direction of each of the operating bodies.

8. The information processing apparatus according to claim 7,
wherein the circuitry is further configured to:
calculate an aspect ratio of a region corresponding to each of the plurality of operating bodies,
detect a longitudinal direction of the first operating body, of which the aspect ratio of the region of operation is within a predetermined range, among the operating bodies, and
allocate a command to a direction with reference to the longitudinal direction of the first operating body.

9. The information processing apparatus according to claim 1,
wherein the circuitry is further configured to detect the position of the first operating body that is in contact or close proximity with the display.

10. The information processing apparatus according to claim 1, wherein the operation is a reversion to a state of the display prior to detection of the first operating body when the first operating body is separated from the display at the first location.

11. An information processing method comprising:
detecting, via circuitry of an information processing apparatus, a longitudinal direction of a first operating body;
allocating, via the circuitry, a first command to a direction with reference to the longitudinal direction of the first operating body;
generating, via the circuitry, a first image related to the first command upon contact of the first operating body with a display, at a first location, wherein the first image is displayed in a first screen region that is separated from a second screen region by a boundary within the display, with a position of the first operating body at the first location as the boundary and along the longitudinal direction of the first operating body; and
perform, via the circuitry, an operation upon separation of the first operating body from the display, wherein the operation is based on a location of the first operating body on the display when the first operating body is initially separated from the display following the contact of the first operating body with the display at the first location, and
wherein, when the first operating body is moved without separation from the display from the first location to a second location that is different from the first location, and separated from the display at the second location, the operation is an activation of the first command or an activation of a second command, and
generate a second image upon contact of a second operating body with the display at third location, wherein the second image is displayed in a third screen region that is separated from the first screen region and the second screen region by a plurality of boundaries within the display, and wherein a location and area of the third screen region is based on an orientation of a longitudinal direction of the second operating body on the display.

12. A non-transitory computer-readable medium comprising instructions for causing a computer to:
detect a longitudinal direction of a first operating body;
allocate a first command to a direction with reference to the longitudinal direction of the first operating body;
generate a first image related to the first command upon contact of the first operating body with a display, at a first location, wherein the first image is displayed in a first screen region that is separated from a second screen region by a boundary within the display, with a position of the first operating body at the first location as the boundary and along the longitudinal direction of the first operating body; and perform an operation upon separation of the first operating body from the display, wherein the operation is based on a location of the first operating body on the display when the first operating body is initially separated from the display following the contact of the first operating body with the display at the first location, and
wherein, when the first operating body is moved without separation from the display from the first location to a second location that is different from the first location, and separated from the display at the second location, the operation is an activation of the first command or an activation of a second command, and
generate a second image upon contact of a second operating body with the display at third location, wherein the second image is displayed in a third screen region that is separated from the first screen region and the second screen region by a plurality of boundaries within the display, and wherein a location and area of the third screen region is based on an orientation of a longitudinal direction of the second operating body on the display.

* * * * *